US011520409B2

(12) United States Patent
Kwon et al.

(10) Patent No.: US 11,520,409 B2
(45) Date of Patent: Dec. 6, 2022

(54) HEAD MOUNTED DISPLAY DEVICE AND OPERATING METHOD THEREOF

(71) Applicant: SAMSUNG ELECTRONICS CO., LTD., Suwon-si (KR)

(72) Inventors: Taehyuk Kwon, Suwon-si (KR); Deokho Kim, Suwon-si (KR); Byeongwook Yoo, Suwon-si (KR); Gunill Lee, Suwon-si (KR); Wonwoo Lee, Suwon-si (KR); Jaewoong Lee, Suwon-si (KR); Sunghoon Yim, Suwon-si (KR); Jiwon Jeong, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 16/844,388

(22) Filed: Apr. 9, 2020

(65) Prior Publication Data

US 2020/0326783 A1    Oct. 15, 2020

Related U.S. Application Data

(60) Provisional application No. 62/832,483, filed on Apr. 11, 2019.

(30) Foreign Application Priority Data

Sep. 4, 2019    (KR) .......................... 10-2019-0109494

(51) Int. Cl.
*G06F 3/01*    (2006.01)
*G06T 11/60*    (2006.01)
*G06V 40/10*    (2022.01)

(52) U.S. Cl.
CPC .............. *G06F 3/017* (2013.01); *G06T 11/60* (2013.01); *G06V 40/113* (2022.01)

(58) Field of Classification Search
CPC .......... G06F 3/017; G06F 3/011; G06T 11/60; G06K 9/00389; G06K 9/6271
See application file for complete search history.

(56) References Cited

U.S. PATENT DOCUMENTS 5,594,469 A  *  1/1997  Freeman ................. G06F 3/017
                                                                345/158
8,064,704 B2    11/2011  Kim et al.
(Continued)

FOREIGN PATENT DOCUMENTS

| JP | 2010146481 A | 7/2010 |
| JP | 2011198150 A | 10/2011 |
| KR | 10-1812227 B1 | 12/2017 |

OTHER PUBLICATIONS

International Search Report (PCT/ISA/210) and Written Opinion (PCT/ISA/237) dated Jul. 13, 2020 issued by the International Searching Authority in International Application No. PCT/KR2020/004820.

(Continued)

*Primary Examiner* — Motilewa Good-Johnson
(74) *Attorney, Agent, or Firm* — Sughrue Mion, PLLC

(57) ABSTRACT

Provided are an HMD device and operating method thereof. The operating method of an HMD device includes displaying at least one object in a display area of a transparent display, obtaining an image of a hand of a user interacting with the displayed object; determining a direction in which the hand is facing based on the obtained image, and performing a function for the object corresponding the direction in which the hand is facing.

14 Claims, 19 Drawing Sheets

(a)

(b)

(56) References Cited

U.S. PATENT DOCUMENTS

| | | | |
|---|---|---|---|
| 8,558,759 B1 | 10/2013 | Prada Gomez et al. | |
| 8,836,768 B1* | 9/2014 | Rafii | G06F 3/0304 |
| | | | 348/47 |
| 9,189,614 B2* | 11/2015 | DeLuca | G06F 21/32 |
| 9,223,402 B2 | 12/2015 | Cho | |
| 9,696,795 B2* | 7/2017 | Marcolina | G06F 3/017 |
| 10,095,030 B2* | 10/2018 | Lundberg | G06F 3/04845 |
| 10,739,877 B2* | 8/2020 | Seong | G06F 3/04886 |
| 10,798,292 B1* | 10/2020 | Lei | G03B 13/36 |
| 11,262,841 B2* | 3/2022 | Davis | A61B 5/1125 |
| 2010/0054534 A1* | 3/2010 | Zheng | H04N 21/4223 |
| | | | 382/103 |
| 2010/0188353 A1* | 7/2010 | Yoon | G06F 3/04883 |
| | | | 345/173 |
| 2012/0113223 A1* | 5/2012 | Hilliges | G06F 3/00 |
| | | | 348/46 |
| 2013/0265284 A1* | 10/2013 | Yun | G06F 3/0488 |
| | | | 345/175 |
| 2015/0153833 A1* | 6/2015 | Pinault | G06F 3/017 |
| | | | 345/156 |
| 2015/0177842 A1* | 6/2015 | Rudenko | G06F 21/32 |
| | | | 345/156 |
| 2015/0187357 A1 | 7/2015 | Xia et al. | |
| 2015/0253951 A1 | 9/2015 | Watanabe et al. | |
| 2015/0269783 A1* | 9/2015 | Yun | G06F 3/0304 |
| | | | 345/633 |
| 2016/0140384 A1* | 5/2016 | Yang | G06F 3/0304 |
| | | | 345/156 |
| 2016/0224123 A1* | 8/2016 | Antoniac | G06F 3/017 |
| 2016/0357263 A1* | 12/2016 | Antoniac | G02B 27/017 |
| 2017/0123487 A1* | 5/2017 | Hazra | G06F 1/163 |
| 2017/0140552 A1 | 5/2017 | Woo et al. | |
| 2017/0169616 A1* | 6/2017 | Wiley | G06F 3/017 |
| 2017/0228130 A1* | 8/2017 | Palmaro | G06F 3/0485 |
| 2017/0287222 A1* | 10/2017 | Fujimaki | G06T 19/006 |
| 2018/0101223 A1* | 4/2018 | Ishihara | G06T 19/006 |
| 2018/0217680 A1* | 8/2018 | Sudou | G06F 3/011 |
| 2018/0366091 A1 | 12/2018 | Han et al. | |
| 2019/0018479 A1* | 1/2019 | Minami | G06F 3/017 |
| 2019/0121441 A1* | 4/2019 | Ishikawa | G06F 3/04842 |
| 2019/0121522 A1* | 4/2019 | Davis | H04N 9/3147 |
| 2019/0213792 A1* | 7/2019 | Jakubzak | G06F 3/017 |
| 2019/0383903 A1* | 12/2019 | Chao | G06K 9/00986 |
| 2019/0384407 A1* | 12/2019 | Smith | G06K 9/00389 |
| 2020/0129850 A1 | 4/2020 | Ohashi | |
| 2020/0150861 A1* | 5/2020 | Jiang | G06K 9/00355 |
| 2020/0225758 A1* | 7/2020 | Tang | G06F 3/011 |
| 2020/0278754 A1* | 9/2020 | Handa | G06K 9/00382 |
| 2020/0301513 A1* | 9/2020 | Mejia Cobo | G06F 3/011 |
| 2020/0301514 A1* | 9/2020 | Zhao | G06N 3/0472 |
| 2021/0191600 A1* | 6/2021 | Lemay | G06F 3/04883 |
| 2022/0121344 A1* | 4/2022 | Pastrana Vicente | G06F 3/017 |

OTHER PUBLICATIONS

Communication dated Mar. 14, 2022 issued by the European Patent Office in European Patent Application No. 20788403.2.

\* cited by examiner

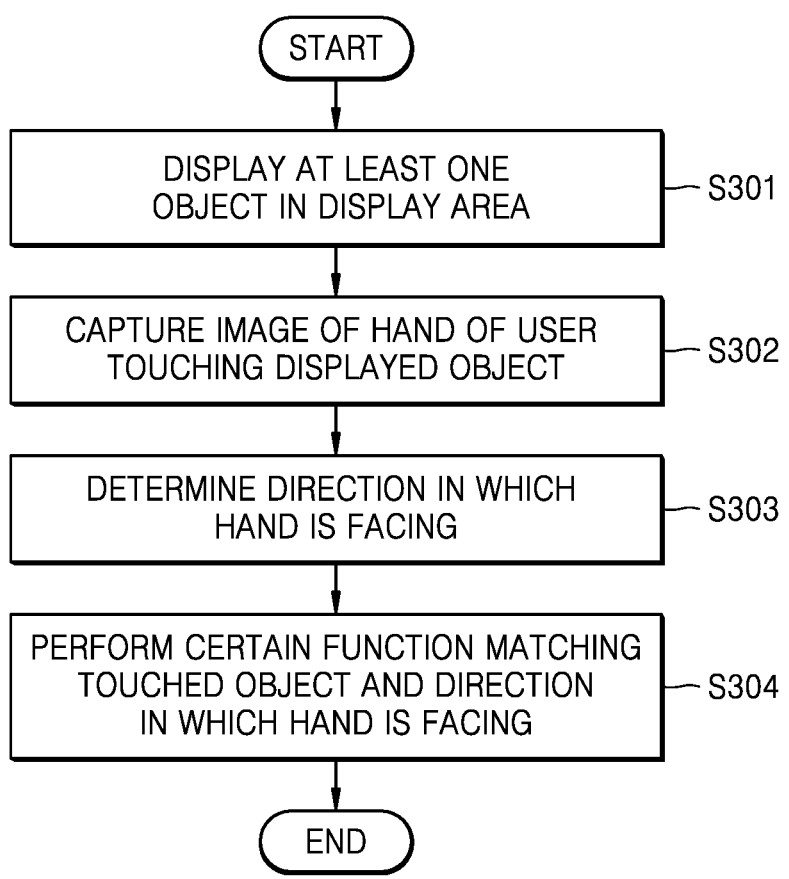

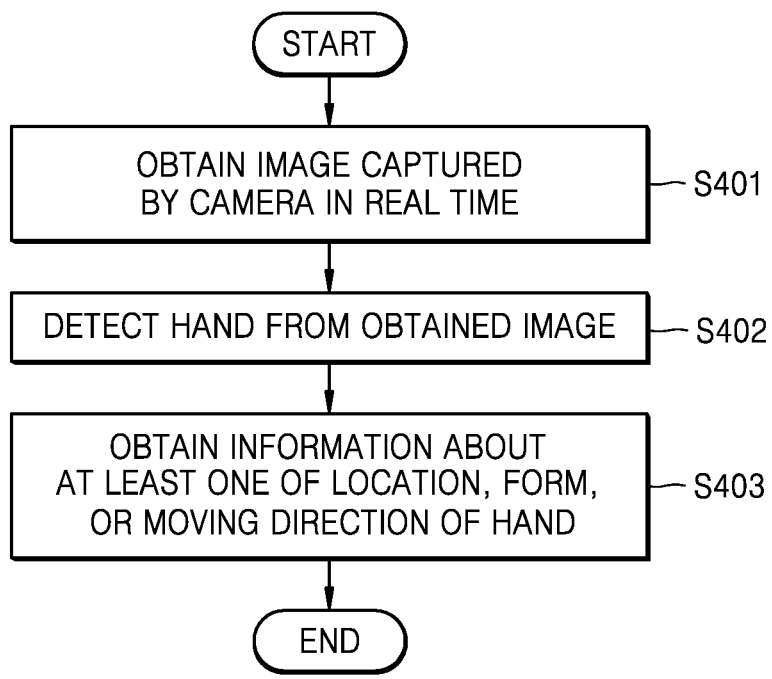

(a)  (b)

HEAD MOUNTED DISPLAY DEVICE AND OPERATING METHOD THEREOF

CROSS-REFERENCE TO RELATED APPLICATIONS

This application is based on and claims the benefit of U.S. Provisional Patent Application No. 62/832,483, filed on Apr. 11, 2019, in the United States Patent and Trademark Office, and claims priority under 35 U.S.C. § 119 to Korean Patent Application No. 10-2019-0109494, filed on Sep. 4, 2019, in the Korean Intellectual Property Office, the disclosure of which is incorporated by reference herein in its entirety.

BACKGROUND

1. Field

The disclosure relates to a head mounted display (HMD) device and an operating method thereof, and more particularly, to an HMD device capable of understanding an intention of a user based on a direction in which a user's hand is facing and performing a certain function according to the intention of the user, and an operating method of the HMD device.

2. Description of the Related Art

With the recent development of technologies, various types of wearable devices are emerging. Among the wearable devices, a head mounted display (HMD) device worn on a user's head may provide a user with an augmented reality (AR) service by presenting visual information about a virtual object through a transparent display.

Conventional wearable devices may interact with the user based on voice recognition or physical touch recognition, but such interactions limit the user convenience.

SUMMARY

An objective of the disclosure is to provide a head mounted display (HMD) device and operating method thereof where the HMD device understands an intention of a user regarding an interaction with an object in a display area based on a direction in which the user's hand is facing, thereby giving the user a more immersive experience.

The objective of the disclosure is not limited thereto, and other objectives and advantages of the disclosure, although not mentioned, may also be appreciated through the following description and be more clearly understood by embodiments of the disclosure. Furthermore, it may be easily seen that the objectives and advantages of the disclosure may be attained by elements recited in the appended claims and combinations thereof.

Additional aspects will be set forth in part in the description which follows and, in part, will be apparent from the description, or may be learned by practice of the presented embodiments of the disclosure.

According to an embodiment of the disclosure, an operating method of a head mounted display (HMD) device includes displaying at least one object in a display area of a transparent display, obtaining an image of a hand of a user interacting with the displayed object, determining a direction in which the hand is facing, based on the obtained image, and performing a function for the object corresponding the direction in which the hand is facing.

The operating method may further include obtaining information about at least one of a location, a form, or a moving direction of the hand in the display area, based on the obtained image.

The determining of the direction in which the hand is facing, based on the obtained image, may include measuring an angle between a palm of the hand and a surface of the transparent display, and determining the direction in which the hand is facing, based on the measured angle.

The determining of the direction in which the hand is facing may include classifying the direction in which the hand is facing as one of an inward direction in which the palm of the hand is facing the transparent display and an outward direction in which the palm of the hand is facing an opposite direction of the transparent display.

The performing of the function of the HMD device may include performing a function corresponding to a floating object interacting with the hand of the user when the object interacting with the hand of the user is the floating object and the direction in which the hand is facing is the inward direction.

The performing of the function of the HMD device may include determining that an interaction with the floating object is made when a distance between the transparent display and the hand corresponds to a threshold distance or less.

The performing of the function of the HMD device may include performing a function corresponding to a background object interacting with the hand of the user when the object interacting with the hand of the user is the background object and the direction in which the hand is facing is the outward direction.

The operating method may further include identifying the object interacting with the hand of the user, based on the direction in which the hand is facing.

The displaying of the at least one object in the display area of the transparent display may include determining whether to display the object in an overlapping area between the hand and the object in the display area, based on the direction in which the hand is facing.

The displaying of the at least one object in the display area of the transparent display may include identifying a depth of the hand interacting with the object, based on the obtained image, and determining whether to display the object in an overlapping area between the hand and the object in the display area based on the identified depth of the hand and a type of the object.

According to another embodiment of the disclosure, an HMD device includes a transparent display, a memory storing one or more instructions, and at least one processor configured to execute the one or more instructions to control the HMD device where the at least one processor is further configured to execute the one or more instructions to display at least one object in a display area of the transparent display, obtain an image of a hand of a user interacting with the displayed object determine a direction in which the hand interacting with the object is facing, based on the obtained image, and perform a function of the HMD device, the function matching the object interacting with the hand of the user and the direction in which the hand is facing.

The at least one processor may be further configured to obtain information about at least one of a location, a form, or a moving direction of the hand in the display area, based on the obtained image.

The at least one processor may be further configured to measure an angle between a palm of the hand and a surface of the transparent display, and determine a direction in which the hand is facing, based on the measured angle.

The at least one processor may be further configured to classify the direction in which the hand is facing as one of an inward direction in which the palm of the hand is facing the transparent display and an outward direction in which the palm of the hand is facing an opposite direction of the transparent display.

The at least one processor may be further configured to perform a function corresponding to a floating object interacting with the hand of the user when the object interacting with the hand of the user is the floating object and the direction in which hand is facing is the inward direction.

The at least one processor may be further configured to determine that an interaction with the floating object is made when a distance between the transparent display and the hand corresponds to a threshold distance or less.

The at least one processor may be further configured to perform a function corresponding to a background object interacting with the hand of the user when the object interacting with the hand of the user is the background object and the direction in which the hand is facing is the outward direction.

The at least one processor may be further configured to determine whether to display the object in an overlapping area between the hand and the object in the display area based on the direction in which the hand is facing.

The at least one processor may be further configured to identify a depth of the hand interacting with the object, based on the obtained image, and determine whether to display the object in an overlapping area between the hand and the object in the display area, based on the identified depth of the hand and a type of the object.

According to another embodiment of the disclosure, provided is a computer-readable recording medium having a program recorded thereon, which when executed by a computer, performs a method including displaying at least one object in a display area of a transparent display of a head mounted display (HMD) device, obtaining an image of a hand of a user interacting with the displayed object, determining a direction in which the hand is facing, based on the obtained image, and performing a function for the object corresponding the object interacting with the hand of the user and the direction in which the hand is facing.

BRIEF DESCRIPTION OF THE DRAWINGS

The above and other aspects, features, and advantages of certain embodiments of the disclosure will be more apparent from the following description taken in conjunction with the accompanying drawings, in which:

FIG. 3 is a flowchart illustrating an operating method of an HMD device, according to an embodiment of the disclosure;

FIG. 4 is a flowchart illustrating a method, performed by an HMD device, of analyzing a hand gesture, according to an embodiment of the disclosure;

DETAILED DESCRIPTION

Figure 1:
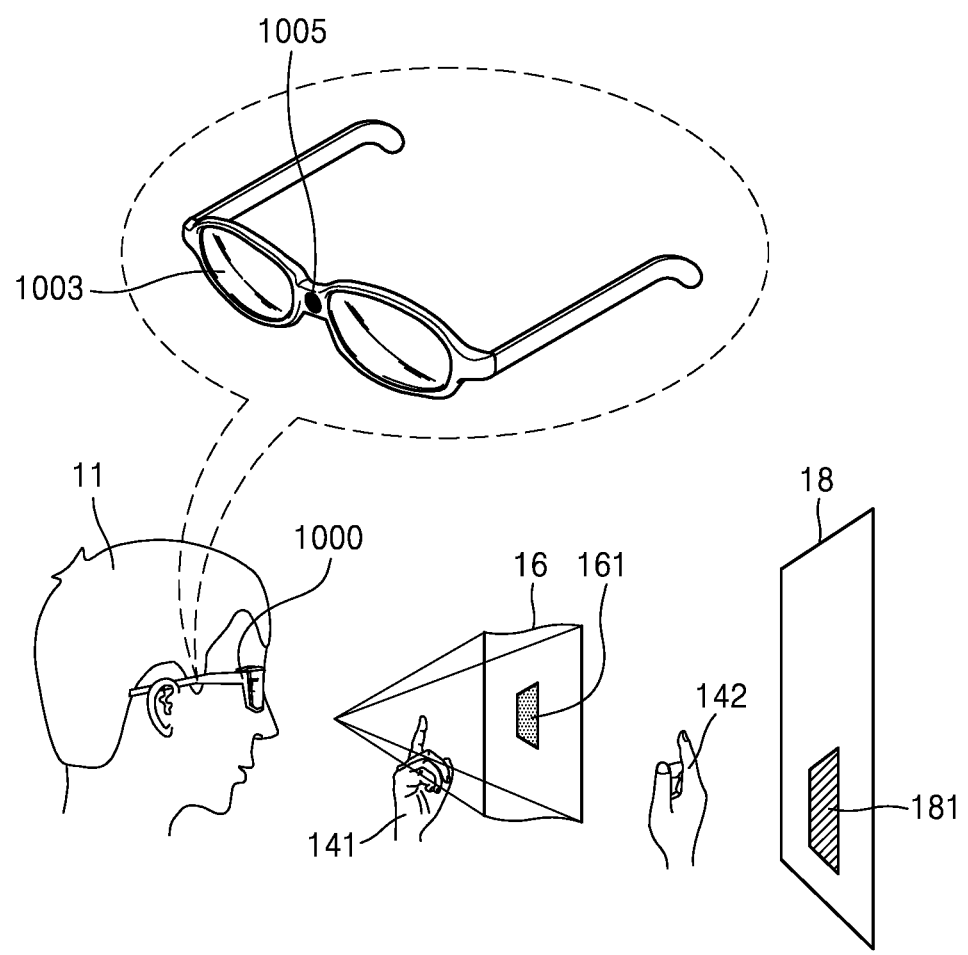
FIG. 1 shows a use environment of a head mounted display (HMD) device, according to an embodiment of the disclosure.

The aforementioned objectives, features and advantages will be described below in detail with reference to accompanying drawings, and accordingly, one of ordinary skill in the art may easily put the technical ideas of the disclosure into practice. Detailed descriptions of some well-known technologies that could possibly obscure the disclosure will be omitted. Exemplary embodiments of the disclosure will now be described with reference to accompanying drawings. Like reference numerals indicate like elements throughout the drawings.

Throughout the disclosure, the expression "at least one of a, b or c" indicates only a, only b, only c, both a and b, both a and c, both b and c, all of a, b, and c, or variations thereof.

FIG. 1 shows a use environment of a head mounted display (HMD) device, according to an embodiment of the disclosure.

Referring to FIG. 1, a head mounted display (HMD) device 1000 may display an image through a transparent display 1003.

The HMD device 1000 may be worn on the head of a user 11 in the same way as glasses. The HMD device 1000 worn on the head of the user 11 may display an image through the transparent display 1003.

When the HMD device 1000 displays the image through the transparent display 1003, the user 11 wearing the HMD 1000 may recognize the image as being displayed in a display area 16.

The display area 16 refers to a virtual area in which the HMD device 1000 may display an image through the transparent display 1003. For example, the user 11 who wears the HMD device 1000 may recognize that a certain object 161 is displayed at a particular location in the display area 16 as an image displayed through the transparent display 1003. That is, the HMD device 1000 may display an image in the display area 16 through the transparent display 1003.

The HMD device 1000 may display an image that gives a depth feeling such that the user 11 may recognize the object 161 as being located as far as a certain distance from the transparent display 1003. The HMD device 1000 may use, but not exclusively, a stereoscopic 3D (S3D) method using a binocular disparity to display an image that gives a depth feeling in the display area 16.

While the HMD device 1000 displays the image on the transparent display 1003, the user 11 may perceive an outside environment through the light passing through the transparent display 1003. In other words, the HMD device 1000 may use the transparent display 1003 as a see-through display to provide experiences of augmented reality (AR) for the user 11.

The user 11 wearing the HMD device 1000 may recognize the image displayed on an external display 18 through the light passing through the transparent display 1003.

The external display 18 may be a display included in, e.g., a separate external device differentiated from the HMD device 1000, which may display a separate object 181 distinguished from the object 161 displayed in the display area 16 through the transparent display 1003.

In another example, the external display 18 may be a virtual display implemented by a virtual image, which may display the separate object 181 distinguished from the object 161 displayed in the display area 16 through the transparent display 1003.

The user 11 may recognize both the object 161 displayed in the display area 16 and the object 181 displayed on the external display 18 at the same time.

The HMD device 1000 may detect interactions between the object 161 displayed on the transparent display 1003 and the user 11.

The HMD device 1000 may use a camera 1005 to capture an image in front of the HMD device 1000. The HMD device 1000 may detect a hand of the user 11 located in the display area 16 from the image obtained by the camera 1005.

For example, the HMD device 1000 may analyze a gesture of the hand of the user 11 based on the image captured by the camera 1005. The HMD device 1000 may analyze the image captured by the camera 1005 to obtain at least one of a location, a form, or a moving direction of the hand of the user 11 in the display area 16.

For example, the camera 1005 included in the HMD device 1000 may be a red-green-blue depth (RGB-depth) camera capable of obtaining an RGB image and depth information. The HMD device 1000 may obtain the RGB image and the depth information through the RGB-depth camera.

In another example, the HMD device 1000 may include an RGB camera to obtain the RGB image and a depth camera to obtain the depth information. The HMD device 1000 may use the RGB camera and the depth camera by engaging them with each other. The HMD device 1000 may obtain the RGB image and the depth information through the RGB-depth camera and the depth camera, respectively, which are engaged with each other.

After obtaining the RGB image and the depth information, the HMD device 1000 may obtain a three dimensional (3D) location of the hand based on a camera coordinate system. The HMD device 1000 may convert the 3D location obtained to a two dimensional (2D) location in an image coordinate system of the display area 16.

Detecting a body part included in an image based on the RGB image and the depth information obtained by the RGB-depth camera and obtaining the 3D location of the detected body part belong to techniques commonly used in image processing areas, and hence, detailed descriptions of the principle of capturing and analyzing an image using the RGB-depth camera will be omitted herein.

In the meantime, the HMD device 1000 may detect interactions between the hand of the user 11 and the object 161 based on a result of analyzing a gesture of the hand of the user 11.

The HMD device 1000 may determine a direction in which the hand of the user 11 interacting with the object 161 displayed in the display area 16 is facing, based on the image captured by the camera 1005.

For example, the HMD device 1000 may measure an angle between the palm of the hand of the user 11 and the surface of the transparent display 1003. The HMD device 1000 may determine a direction in which the hand of the user 11 interacting with the object 161 displayed in the display area 16 is facing, based on the measured angle.

For example, the HMD device 1000 may classify the hand of the user 11 interacting with the object 161 displayed in the display area 16 as one of a hand 141 in an outward direction in which the palm of the hand is facing the opposite direction of the HMD device 1000 and a hand 142 in an inward direction in which the palm of the hand is facing the HMD device 1000.

For example, the HMD device 1000 may determine whether to display the object 161 in the display area 16 based on the direction in which the hand of the user 11 is facing.

For example, the HMD device 1000 may determine how to display the object 161 in the display area 16 based on a property of the object 161.

The HMD device 1000, for example, may display the object 161 such that the user 11 may recognize the object 161 as being located in front of the hand of the user 11 located in the display area 16 regardless of the direction the hand of the user 11 is facing.

On the other hand, the HMD device 1000, for example, may display the object 161 such that the user 11 may recognize the object 161 as being located behind the hand of the user 11 located in the display area 16 regardless of the direction the hand is facing.

In another example, the HMD device 1000 may measure a distance between the transparent display 1003 and the hand of the user 11, and display the object 161 such that the user 11 may recognize the object 161 as being located in front of or behind the hand located in the display area 16.

In other words, the HMD device 1000 may display the object 161 such that the user 11 may recognize the object 161 as being located at a certain distance away from the transparent display 1003 regardless of the direction in which the hand is facing.

The HMD device 1000 may determine how to display the object 161 in the display area 16 based on at least one of a property of the object 161 to be displayed in the display area 16 or a direction in which the hand of the user 11 is facing.

Hereinafter, an object giving a depth experience to be displayed by the HMD device 1000 for the user 11 to recognize the object as being in front of the hand is referred to as a floating object, and an object giving a depth experience to be displayed for the user 1 to recognize the object as being behind the hand is referred to as a background object.

An embodiment of the disclosure to determine how to display the object 161 in the display area 16 based on at least one of a direction in which the hand of the user 11 is facing or a property of the object 161 will be described later in connection with FIG. 2.

As to how to interact with the object 161 displayed in the display area 16, the HMD device 1000 may set a condition regarding at least one of the direction in which the hand of the user 11 is facing or the property of the object 161.

The HMD device 1000, for example, may display the object 161 such that the user 16 may recognize the object 161 as being located in front of the hand of the user 11 located in the display area 16, when the object 161 to be displayed in the display area 16 is the floating object. The HMD device 1000 may display the floating object in the display area 16 and simultaneously, set a condition by which interactions with the floating object are made only when the direction in which the hand of the user 11 is facing is an inward direction.

On the other hand, the HMD device 1000 may display the object 161 such that the user 16 may recognize the object 161 as being located behind the hand of the user 11 located in the display area 16, when the object 161 to be displayed in the display area 16 is the background object. The HMD device 1000 may display the background object in the display area 16 and simultaneously, set a condition by which interactions with the background object are made only when the direction in which the hand of the user 11 is facing is an outward direction.

Hereinafter, an operation of the hand 141 of the user 11 in the outward direction interacting with an object displayed in the display area 16 is referred to as an on screen input, and an operation of the hand 142 of the user 11 in the inward direction interacting with the object displayed in the display area 16 is referred to as a back screen input.

In the meantime, when an interaction with the object 161 displayed in the display area 16 is made, the HMD device 1000 may perform a certain function that matches the object 161 interacting with the hand of the user 11 and the direction in which the hand of the user 11 touching the object 161 is facing.

For example, as the user 11 interacts with the object 161 displayed in the display area 16 using the hand 141 in the outward direction or the hand 142 in the inward direction, the HMD device 1000 may perform a first function corresponding to the object 161 no matter which direction the hand is facing.

In another example, as the user 11 interacts with the object 161 displayed in the display area 16 using the hand 141 in the outward direction, the HMD device 1000 may perform a second function corresponding to the direction of the hand and the object 161 selected by the on screen input.

On the other hand, as the user 11 interacts with the object 161 displayed in the display area 16 using the hand 142 in the inward direction, the HMD device 1000 may perform a third function corresponding to the direction of the hand and the object 161 selected by the back screen input.

FIGS. 2A through 2D show a method, performed by an HMD device, of displaying an object in a display area, according to an embodiment of the disclosure.

The HMD device 1000 may determine how to display an object in a display area based on a property of an object.

Figure 2A:
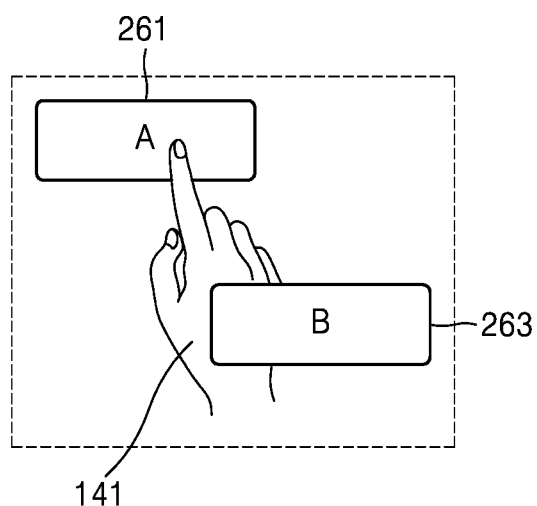
FIGS. 2A through 2D show a method, performed by an HMD device, of displaying an object in a display area, according to an embodiment of the disclosure.

Referring to FIG. 2A, as the hand 141 in the outward direction located in a display area is used for the on screen input, the hand 141 in the outward direction overlaps object A 261 and object B 263 displayed in the display area.

For example, the HMD device 1000 may set the object B 263 as a floating object. Specifically, the HMD device 1000 may display the object B 263 such that the user 11 may recognize the object B 263 as being in front of the hand located in the display area regardless of the direction in which the hand of the user 11 is facing.

While the hand 141 of the user 11 in the outward direction is interacting with the object A 261 displayed in the display area, the user 11 may recognize that the object B 263 is in front of the hand 141 of the user 11 in the outward direction.

Figure 2B:
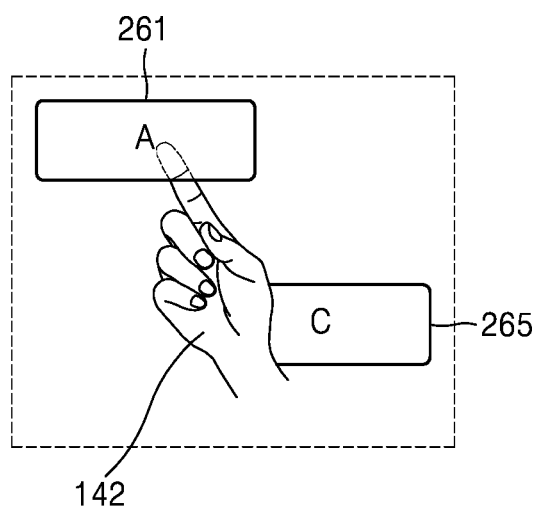

Referring to FIG. 2B, as the hand 142 in the inward direction located in a display area is used for the back screen input, the hand 142 in the inward direction overlaps the object A 261 and object C 265 displayed in the display area.

For example, the HMD device 1000 may set the object C 265 as a background object. Specifically, the HMD device 1000 may display the object C 265 such that the user 11 may recognize the object C 265 as being behind the hand located in the display area regardless of the direction the hand of the user 11 is facing.

While the hand 142 in the inward direction of the user 11 is interacting with the object A 261 displayed in the display area, the user 11 may recognize that the object C 265 is behind the hand 142 of the user 11 in the inward direction.

In the meantime, in an embodiment of the disclosure, the HMD device 1000 may determine how to display an object in a display area based on at least one of a direction in which the hand of the user 11 is facing or a property of an object.

For example, the HMD device 1000 may determine whether to display an object in an area where the object overlaps the hand of the user 11 in the display area based on the direction in which the hand of the user 11 facing.

Figure 2C:
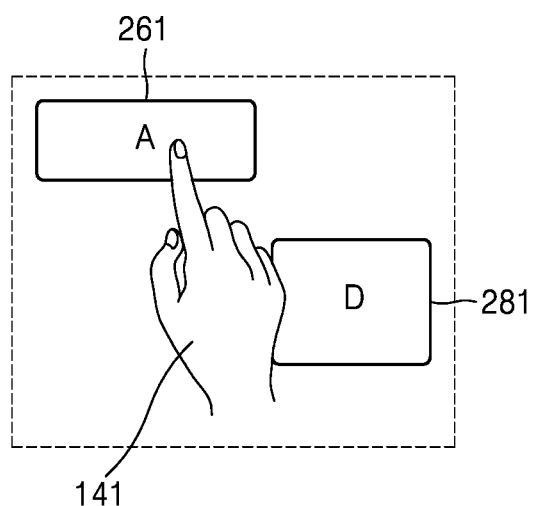

Referring to FIG. 2C, as the hand 141 in the outward direction located in a display area is used for the on screen input, the hand 141 in the outward direction overlaps the object A 261 displayed in the display area and an object D 281 displayed in the external display 18.

The HMD device 1000 may display the object A 261 such that the user 11 may recognize the object A 261 as being behind the hand 141 in the outward direction located in the display area. That is, the HMD device 1000 may set the object A 261 as a background object.

For example, when it is determined that the direction in which the hand of the user 11 is facing is the outward direction, the HMD device 1000 may get rid of the area where the hand 141 in the outward direction and the object A 261 overlap each other from the object A 261 displayed in the display area. Such a method of displaying an image by removing an area where the user's hand and an object overlap each other is generally called a hand occlusion method.

How the HMD device 1000 removes the area where the user's hand and the object overlap each other from the object through the hand occlusion method will be described later in detail in connection with FIG. 8.

As the HMD device 1000 gets rid of the overlapping area between the hand 141 in the outward direction and the object A 261 from the object A 261 displayed in the display area, the user 11 may recognize that the hand 141 in the outward direction is located in front of the object A 261 displayed in the display area.

Figure 2D:
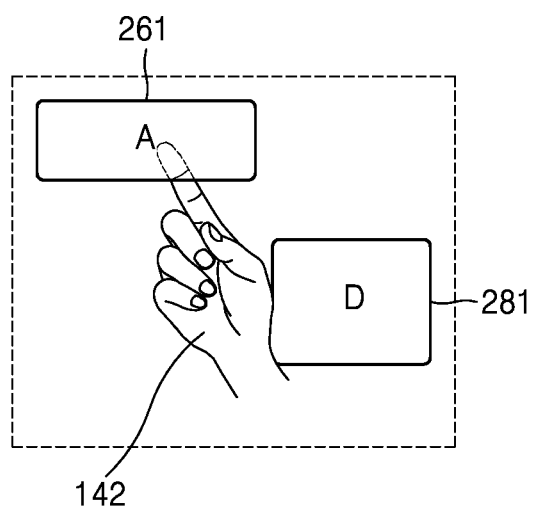

Referring to FIG. 2D, as the hand 142 in the inward direction located in a display area is used for the back screen input, the hand 142 in the inward direction overlaps the object A 261 displayed in the display area and the object D 281 displayed in the external display 18.

The HMD device 1000 may display the object A 261 such that the user 11 may recognize the object A 261 as being in front of the hand 142 in the inward direction located in the display area. That is, the HMD device 1000 may set the object A 261 as a floating object.

For example, when it is determined that the direction in which the hand of the user 11 is facing is the inward direction, the HMD device 1000 may display the entire area of the object A 261 in the display area regardless of whether the hand 142 in the inward direction and the object A 261 overlap each other.

As the HMD device 1000 displays the entire area of the object A 261 in the display area, the user 11 may recognize that the hand 142 in the inward direction is located behind the object A 261 displayed in the display area.

In another example, the HMD device 1000 may measure a distance between the transparent display 1003 and the hand of the user 11, and determine whether to display an object in the overlapping area between the hand of the user 11 and the object in the display area based on the measured distance and the type of the object.

For example, the HMD device 1000 may identify depth of the hand of the user 11 interacting with the object based on an image captured by the camera 1005, and determine whether to display the object in the overlapping area between the hand of the user 11 and the object in the display area based on the identified depth of the hand and the type of the object.

Turning back to FIG. 2C, the HMD device 1000 may display the object A 261 such that the user 11 may recognize the object A 261 as being behind the hand 141 in the outward direction located in the display area only when the hand 141 in the outward direction is located within a certain distance from the transparent display 1003.

When the hand 141 in the outward direction having been used for the on screen input for the object A 261 is beyond the certain distance from the transparent display 1003, the HMD device 1000 may display the object A 261 such that the user 11 may recognize the object A 261 as being in front of the hand 141 in the outward direction located in the display area as shown in FIG. 2D.

In other words, the HMD device 1000 may make the user recognize the object A 261 as being located a certain distance away from the transparent display 1003 by setting the object A 261 to one of the background object or the floating object based on a distance between the transparent display 1003 and the hand of the user 11.

FIG. 3 is a flowchart illustrating an operating method of an HMD device, according to an embodiment of the disclosure.

Referring to FIG. 3, the HMD device 1000 displays at least one object in a display area through the transparent display 1003 in operation S301. The user 11 wearing the HMD device 1000 may recognize that at least one object is displayed at a particular location in the display area as an image displayed through the transparent display 1003.

The HMD device 1000 captures an image of a hand of the user 11 interacting with the object displayed in the display area, in operation S302. For example, the HMD device 1000 may use the camera 1005 capable of capturing an image in front of the user 11 wearing the HMD device 1000 to capture an image of the hand of the user 11 interacting with the object displayed in the display area.

After taking an image of the hand of the user 11, the HMD device 1000 determines a direction in which the hand interacting with the object is facing, based on the captured image, in operation S303. For example, the HMD device 1000 may classify the hand of the user 11 interacting with the object displayed in the display area 16 as one of a hand 141 in an outward direction in which the palm of the hand is facing the opposite direction of the transparent display 1003 and a hand 142 in an inward direction in which the palm of the hand is facing the transparent display 1003.

Finally, in operation S304, the HMD device 1000 performs a certain function matching the object interacting with the hand of the user 11 and the direction in which the hand is facing.

FIG. 4 is a flowchart illustrating a method, performed by an HMD device, of analyzing a hand gesture, according to an embodiment of the disclosure.

In an embodiment of the disclosure, the HMD device 1000 may analyze a gesture of the hand of the user 11 based on an image captured by the camera 1005. The HMD device 1000 may detect interactions between the hand of the user 11 and the object based on a result of analyzing the gesture of the hand of the user 11.

Referring to FIG. 4, the HMD device 1000 obtains an image captured by the camera 1005 in real time, in operation S401. For example, the camera 1005 may capture an image in front of the user 11 wearing the HMD device 1000 in real time.

In operation S402, the HMD device 1000 may detect the hand from the captured image. Specifically, the HMD device 1000 may analyze the image obtained to determine whether an image area corresponding to a hand is included in the image.

How the HMD device 1000 detects a hand from an image obtained may include, for example, a detection method using skin color models created based on skin color information, a detection method using 2D or 3D virtual hand models, and a detection method using 3D image data including depth information, without being limited thereto.

Upon detection of a hand from the obtained image, the HMD device 1000 obtains information about at least one of a location, a form, or a moving direction of the detected hand, in operation S403.

For example, the HMD device 1000 may obtain an outline of the hand from the image obtained using the camera 1005. For example, the HMD device 100 may suppose that the hand of the user 11 is within a certain distance from the HMD device 1000, and detect a gesture of the hand of the user 11 using a depth image and RGB color information.

Figure 5:
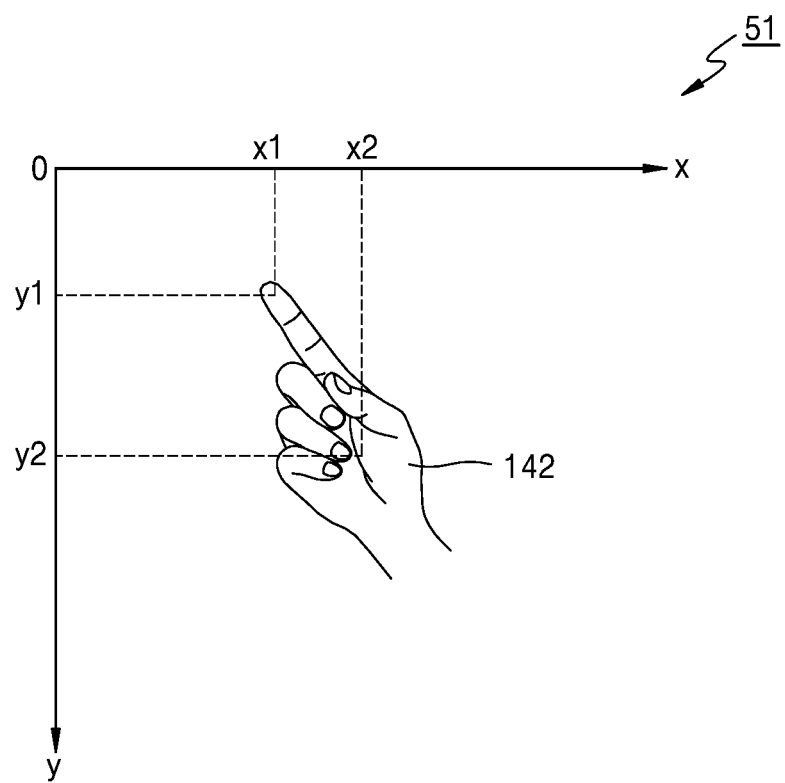
FIG. 5 shows a method, performed by an HMD device, of determining a location of a hand in a display area, according to an embodiment of the disclosure.

FIG. 5 shows a method, performed by an HMD device, of determining a location of a hand in a display area, according to an embodiment of the disclosure.

Referring to FIG. 5, the HMD device 1000 may have a location of the hand in a display area correspond to a point on a 2D plane 51 of an image coordinate system. For example, the HMD device 1000 may have a location of the hand in the display area correspond to 2D coordinates (x, y).

For example, the HMD device 1000 may set an origin in the display area. The 2D coordinates (x, y) corresponding to the location of the hand in the display area may be determined based on the origin.

For example, the HMD device 1000 may determine criteria for determination of the location of the hand to be positions of fingertips of the hand based on information about the form of the hand.

Turning back to FIG. 5, for example, the HMD device 1000 may determine that the direction of the hand interacting with an object displayed in the display area is the inward direction. The HMD device 1000 may determine the positions of the fingertips by obtaining information about the form of the hand 142 in the inward direction. The HMD device 1000 may determine the location of the hand to be at 2D coordinates (x1, y1) based on the determined positions of the fingertips.

In another example, the HMD device 1000 may determine criteria for determination of the position of the hand to be a center position of the palm based on the information about the form of the hand.

Turning back to FIG. 5, for example, the HMD device 1000 may determine that the direction of the hand interacting with an object displayed in the display area is the inward direction. The HMD device 1000 may identify the center position of the palm by obtaining information about the form of the hand 142 in the inward direction. The HMD device 1000 may determine the position of the hand to be at 2D coordinates (x2, y2) based on the determined center position of the palm.

The HMD device 1000 may detect interactions between the object and the hand of the user 11 based on the determined location of the hand and a location at which the object is displayed in the display area.

Figure 6:
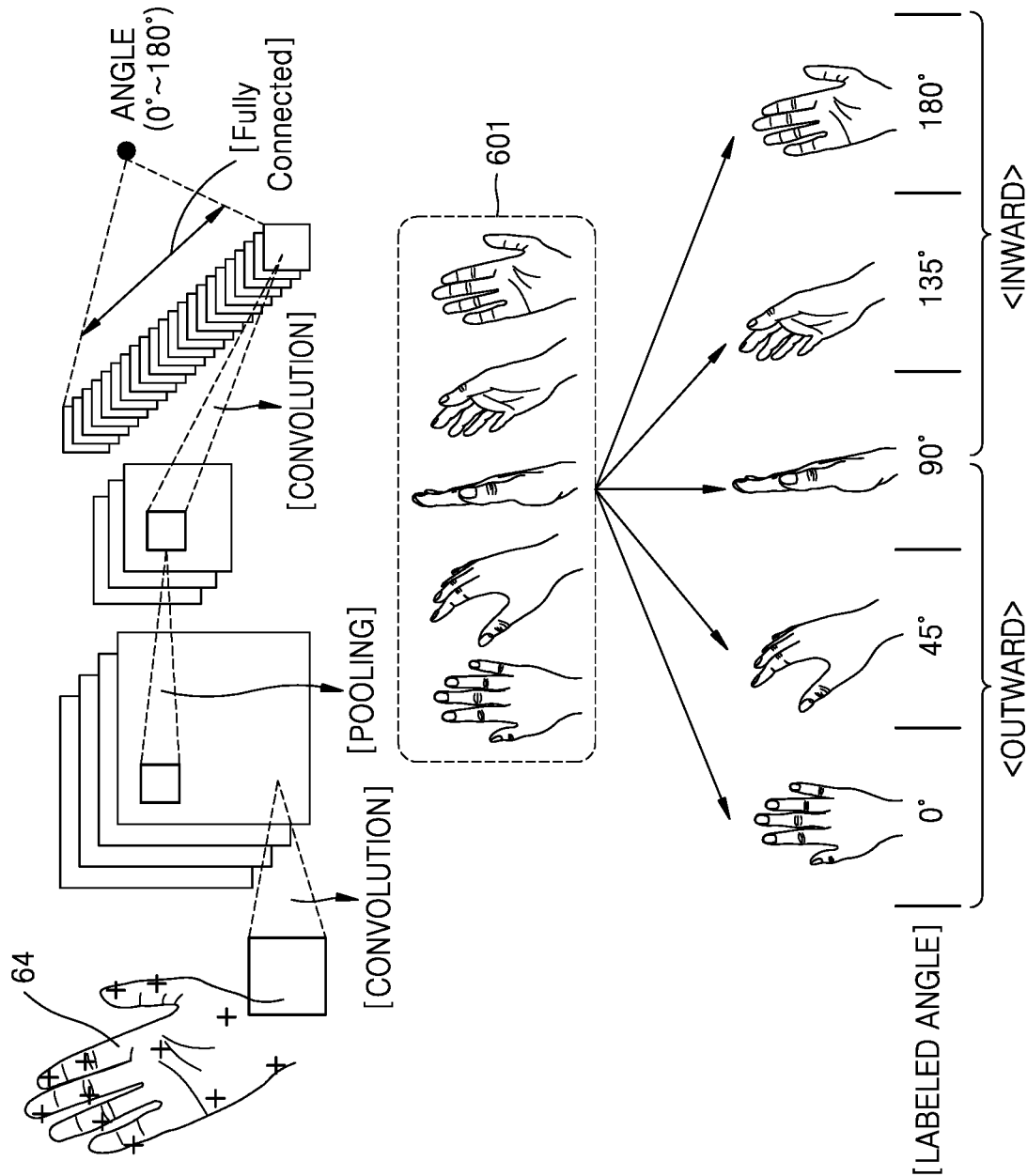
FIG. 6 shows a method, performed by an HMD device, of measuring an angle of a hand, according to an embodiment of the disclosure.

FIG. 6 shows a method, performed by an HMD device, of measuring an angle of a hand, according to an embodiment of the disclosure.

In some embodiments of the disclosure, the HMD device 1000 may measure an angle between the palm of the hand and the surface of the transparent display 1003 to determine a direction in which the hand is facing. The HMD device 1000 may determine the direction in which the hand is facing based on the measured angle.

Referring to FIG. 6, the HMD device 1000 may determine a direction in which the hand of the user 11 is facing by using a deep neural network (DNN). The HMD device 1000 may determine the direction in which the hand of the user 11 is facing based on hand model data trained in advance.

For example, the HMD device 1000 may determine a direction in which the hand of the user 11 is facing using a convolution neural network (CNN).

The CNN is a kind of multi-layered neural network, which may obtain a resultant value through feature extraction and classification steps without directly calculating input original data and outputting the result unlike the existing neural network.

A structure of a general CNN may include a convolution layer, a pooling layer, and a fully-connected layer. The convolution layer and the pooling layer included in the CNN may be used for feature extraction from input data, and the fully-connected layer may be used for classification of the input data.

Specifically, the convolution layer may apply a filter of a particular size to the input data to generate new data to be sent to the next layer, and input/output data of the convolution layer may be called a feature map.

More specifically, the pooling layer may reduce the size of data by sub-sampling the data through a pooling method such as max pooling and average pooling.

As such, the CNN may use the convolution layer and the pooling layer to process the input data, an input image in particular, while maintaining a 3D form of the feature map of the input image, thereby preventing a loss of information about relations between a plurality of images and thus increasing the image recognition rates.

Before the HMD device 1000 determines the direction in which the hand of the user 11 is facing, the CNN used by the HMD device 1000 may receive a plurality of hand images 601 in advance as training data. Upon reception of the plurality of hand images 601, the CNN may output an angle of the hand corresponding to each hand image.

The CNN may be used to train a hand direction detection model by adjusting a weight of each layer included in the CNN, based on a result of comparison between an output hand angle and a labeled angle of each of the plurality of hand images 601.

For example, upon reception of an image 64 of the hand of the user 11 obtained by the camera 1005 of the HMD device 1000, the hand direction detection model may output an angle of the hand of the user 11 as a result of calculation by each layer of the CNN. The HMD device 1000 may determine a direction in which the hand of the user 11 is facing based on the angle of the hand of the user 11 obtained by the hand direction detection model.

For example, when the angle of the hand of the user 11 obtained by the hand direction detection model ranges from 0 (inclusive) to 90 (not inclusive) degrees, the HMD device 1000 may determine that the direction in which the hand of the user 11 is facing is the outward direction. On the other hand, when the angle of the hand of the user 11 obtained by the hand direction detection model ranges from 90 (inclusive) to 180 (inclusive) degrees, the HMD device 1000 may determine that the direction of the hand of the user 11 is the outward direction.

Figure 7:
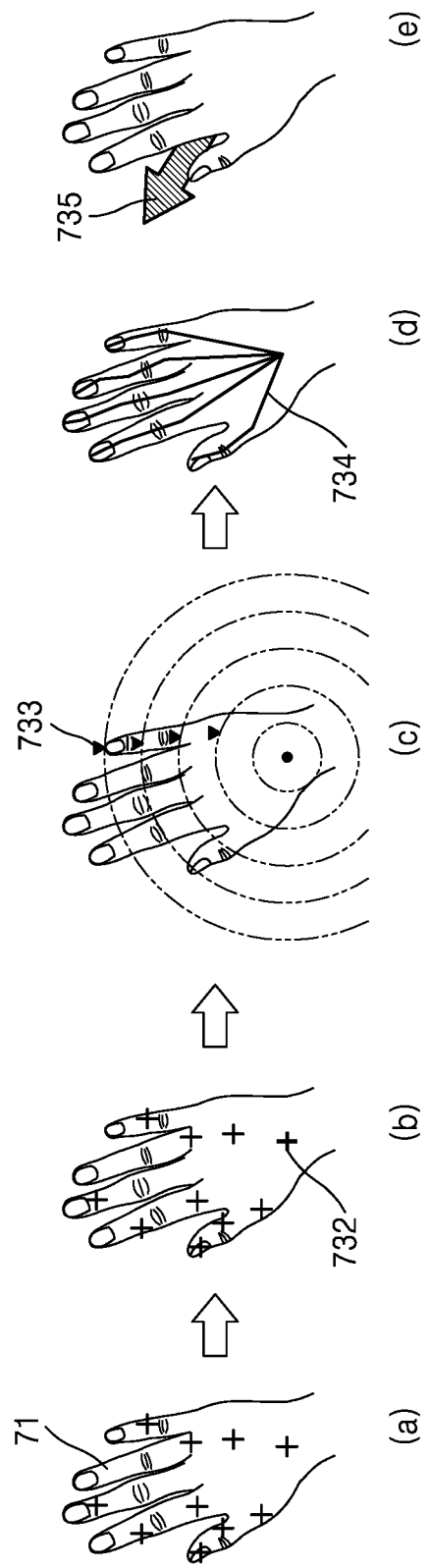
FIG. 7 shows a method, performed by an HMD device, of measuring an angle of a hand, according to another embodiment of the disclosure.

FIG. 7 shows a method, performed by an HMD device, of measuring an angle of a hand, according to another embodiment of the disclosure.

Referring to FIG. 7, the HMD device 1000 may determine a direction in which the hand of the user 11 is facing by creating a skeleton model based on an image of the hand of the user 11.

The skeleton model used to determine a direction in which the hand of the user 11 is facing is a 3D model including information about bone and joint structures and a moving range of a human hand, which may be used as a criterion for geometrical analysis of a movement of the hand.

First, the HMD device 1000 may extract a plurality of features from an image 71 of the hand of the user 11 as shown in (a) of FIG. 7.

Next, the HMD device 1000 may obtain a feature 732 corresponding to the wrist among the plurality of features extracted from the image 71 of the hand of the user 11 as shown in (b) of FIG. 7.

After obtaining the feature 732 corresponding to the wrist, the HMD device 1000 may obtain reference lines circling around the feature 732 in the radial direction in sequence, and determine a position 733 of a finger overlapping the reference lines as shown in (c) of FIG. 7.

Based on the position 733 of the finger overlapping all the reference lines, the HMD device 1000 may obtain finger center lines 734 corresponding to five fingers of the hand of the user 11 as shown in (d) of FIG. 7. The HMD device 1000 may determine a direction 735 in which the hand of the user 11 is facing by identifying the positions of the thumb and little finger based on at least one of a structure or length of the finger center lines 734.

Although how the HMD device 1000 determines a direction of the hand has thus far been described in the embodiments of the disclosure as shown in FIGS. 6 and 7, it is not limited thereto, and it will be obvious to those of ordinary skill in the art that any method of determining a direction of the hand in image processing areas may be used by the HMD device 1000.

Figure 8:
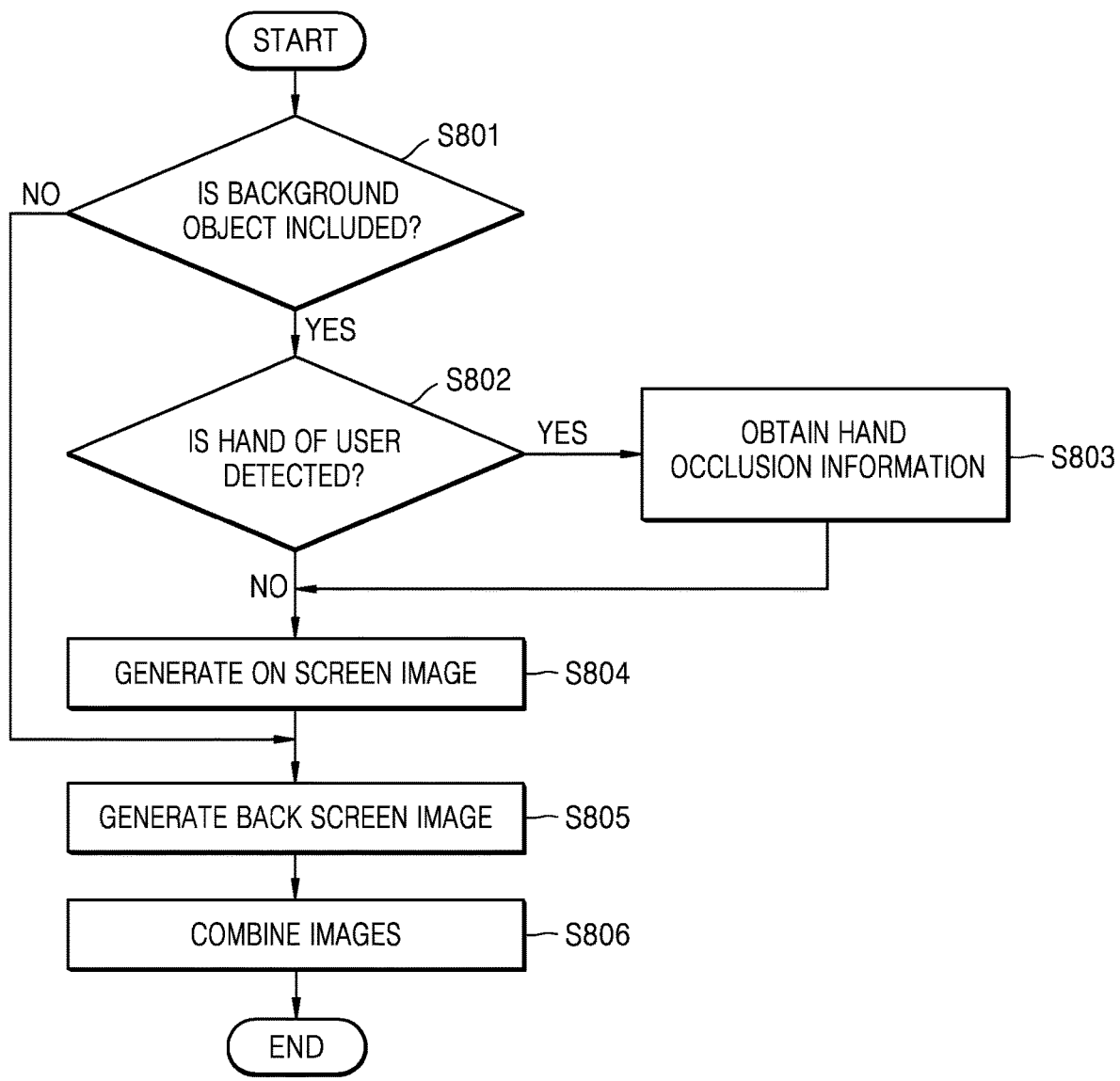
FIG. 8 is a flowchart illustrating a method, performed by an HMD device, of generating an image to be displayed in a display area, according to an embodiment of the disclosure.

FIG. 8 is a flowchart illustrating a method, performed by an HMD device, of generating an image to be displayed in a display area, according to an embodiment of the disclosure.

In some embodiments of the disclosure, the HMD device 1000 may determine a method of displaying an object in a display area based on at least one of a property of the object to be displayed in the display area or a direction in which the hand of the user 11 is facing.

The HMD device 1000 may combine at least two or more images to display the object in the display area according to the determined method.

For example, the HMD device 1000 may generate at least one of the on screen image or the back screen image based on whether a background object is included in the display area and whether the hand of the user is detected, and combine the at least one image generated and display the combined image.

In the disclosure, an image generated by the HMD device 1000 to display at least one background object is referred to as the on screen image.

Furthermore, in the disclosure, an image generated by the HMD device 1000 to display at least one floating object is referred to as the back screen image.

Referring to FIG. 8, the HMD device 1000 determines whether a background object is included in an image to be displayed in the display area 16, in operation S801.

When it is determined in operation S801 that the background object is included in the image to be displayed in the display area 16, the HMD device 1000 determines whether a hand of the user 11 located in the display area 16 is detected in operation S802.

On the other hand, when it is determined in operation S801 that the background object is not included in the image to be displayed in the display area 16, the HMD device 1000 proceeds to operation S805, which will be described later, to generate the back screen image.

When it is determined in operation S802 that the hand of the user 11 located in the display area 16 is detected, the HMD device 1000 obtains hand occlusion information in operation S803.

In the disclosure, the hand occlusion information refers to information used to remove an overlapping area between a background object and the hand of the user 11 from the background object in order to display the background object such that the user 11 may recognize the background object as being behind the hand of the user 11.

For example, the HMD device 1000 may obtain the hand occlusion information by comparing information about a location and a form of the hand of the user 11 in the display area 16 and information about a location and a form of the background object to be displayed in the display area 16.

How the HMD device 1000 determines a location of the hand of the user 11 in the display area 16 is described above in detail in connection with FIG. 5, so the description thereof will not be repeated hereinafter.

The HMD device 1000 may obtain the hand occlusion information to remove the overlapping area between the background object and the hand of the user 11 from the background object by identifying the overlapping area between the background object included in the image displayed in the display area 16 and the hand of the user 11 located in the display area 16.

The hand occlusion information may include, for example, information about at least one of a location, a form, or an area of the overlapping area between the background object included in the image displayed in the display area 16 and the hand of the user 11 located in the display area 16. In operation S804, the HMD device 1000 generates an on screen image based on the hand occlusion information obtained.

For example, the HMD device 1000 may generate an on screen image with the overlapping area between the background object included in the image displayed in the display area 16 and the hand of the user 11 removed therefrom based on the hand occlusion information obtained.

Generating the on screen image with the overlapping area between the background object included in the image displayed in the display area 16 and the hand of the user 11 removed therefrom may be done in such a way to remove an overlapping area corresponding to the hand occlusion information from a complete on screen image.

For example, the HMD device 1000 having obtained the hand occlusion information may generate the complete on screen image. For example, the complete on screen image may include a complete background object regardless of whether there is an overlapping area between the background object included in the image displayed in the display area 16 and the hand of the user 11.

Once the complete on screen image is generated, the HMD device 1000 may remove the overlapping area between the background object and the hand of the user 11 from the complete background object included in the on screen image based on information about at least one of a location, a form, or an area of the overlapping area between the background object and the hand of the user 11.

In another example, having obtained the hand occlusion information, the HMD device 1000 may directly obtain an incomplete background object that includes no overlapping area between the background object and the hand of the user 11 based on information about at least one of a location, a form, or an area of the overlapping area between the background object and the hand of the user 11, and generate an on screen image including the incomplete background object obtained. For example, turning back to FIG. 2A, in some embodiments of the disclosure, the HMD device 1000 may generate an on screen image to be displayed such that the user 11 making an on screen input may recognize the object A 261 as being behind the outward hand 141 located in the display area 16.

For example, as the hand 141 of the user in the outward direction is detected in the display area 16, the HMD device 1000 may obtain the hand occlusion information for the overlapping area between the object A 261, which is a background object, and the hand 141 in the outward direction.

The hand occlusion information for the overlapping area between the background object, object A 261, and the hand 141 in the outward direction may include, for example, information about at least one of a location, a form, or an area of the overlapping area between the object A 261 and the hand 141 in the outward direction.

The HMD device 1000 may use the hand occlusion information for the overlapping area between the object A 261 and the hand 141 in the outward direction to generate an on screen image with the overlapping area between the hand 141 in the outward direction and the object A 261 removed from the object A 261.

In the meantime, when it is determined in operation S802 that the hand of the user 11 is not detected in the display area 16, the HMD device 1000 generates a complete on screen image in operation S804.

Having generated the on screen image, the HMD device 1000 may generate a back screen image in operation S805.

For example, turning back to FIG. 2A, the HMD device 1000 may generate a back screen image to be displayed such that the user 11 may recognize the object B 263 as being in front of the hand located in the display area 16 regardless of the direction in which the hand of the user 11 is facing.

In operation S806, the HMD device 1000 may combine the on screen image generated in operation S804 and the back screen image generated in operation S805. The HMD device 1000 may display the combined image in the display area through the transparent display 1003.

Figure 9:
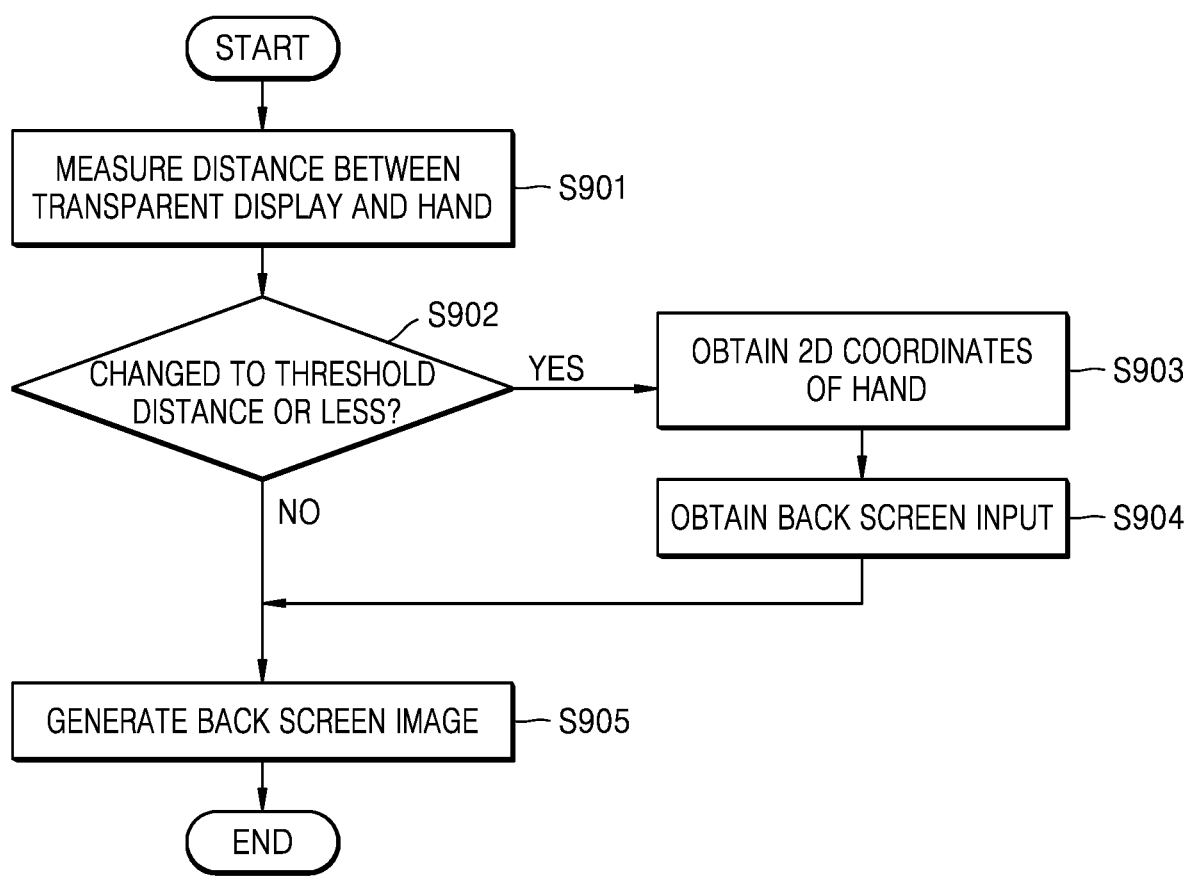
FIG. 9 is a flowchart illustrating a method, performed by an HMD device, of generating a back screen image in response to a back screen input of a user, according to an embodiment of the disclosure.

FIG. 9 is a flowchart illustrating a method, performed by an HMD device, of generating a back screen image in response to a back screen input of a user, according to an embodiment of the disclosure.

Referring to FIG. 9, the HMD device 1000 measures a distance between the transparent display 1003 and the hand of the user 11, in operation S901.

For example, the HMD device 1000 may measure the distance between the transparent display 1003 and the hand of the user 11 using a range measurement sensor.

The range measurement sensor used by the HMD device 1000 in measuring the distance between the transparent display 1003 and the hand of the user 11 may include, but not exclusively, at least one of an infrared sensor, an ultrasonic sensor, or a laser sensor.

In another example, the HMD device 1000 may measure the distance between the transparent display 1003 and the hand of the user 11 based on an RGB image and depth information captured by an RGB-Depth camera.

In another example, the HMD device 1000 may measure the distance between the transparent display 1003 and the hand of the user 11 based on both the RGB image and the depth information captured by the range measurement sensor and the RGB-Depth camera.

In operation S902, the HMD device 1000 determines whether the measured distance corresponds to a threshold distance or less.

When it is determined in operation S902 that the measured distance corresponds to the threshold distance or less, the HMD device 1000 obtains 2D coordinates of the hand of the user 11 in operation S903.

Having obtained the 2D coordinates of the hand of the user 11, the HMD device 1000 obtains an input of the user 11 to a floating object, i.e., a back screen input, in operation S904.

In operation S905, the HMD device 1000 generates a back screen image based on the back screen input of the user 11.

For example, as the HMD device 1000 obtains the back screen input of the user 11, the HMD device 1000 may generate a back screen image to change the form of the floating object.

For example, the HMD device 1000 may generate a back screen image to temporarily increase the size of the floating object in response to an interaction of the user 11 with the floating object.

In another example, the HMD device 1000 may generate a back screen image to change a color of the floating object to a different color in response to an interaction of the user 11 with the floating object.

On the other hand, when it is determined in operation S902 that the measured distance does not correspond to the threshold distance or less, the HMD device 1000 generates a back screen image immediately in operation S905.

In the meantime, although not shown in FIG. 9, the HMD device 1000 may perform the operation S903 simultaneously with the operation S901. Specifically, the HMD device 1000 may measure the distance between the transparent display 1003 and the hand of the user 11 and simultaneously, obtain 2D coordinates of the hand of the user 11.

After performing the operation S903 simultaneously with the operation S901, when it is determined in operation S902 that the measured distance corresponds to the threshold distance or less, the HMD device 1000 obtains a back screen input of the user 11 to the floating object in operation S904 based on the 2D coordinates of the hand of the user 11 obtained in advance.

Figure 10:
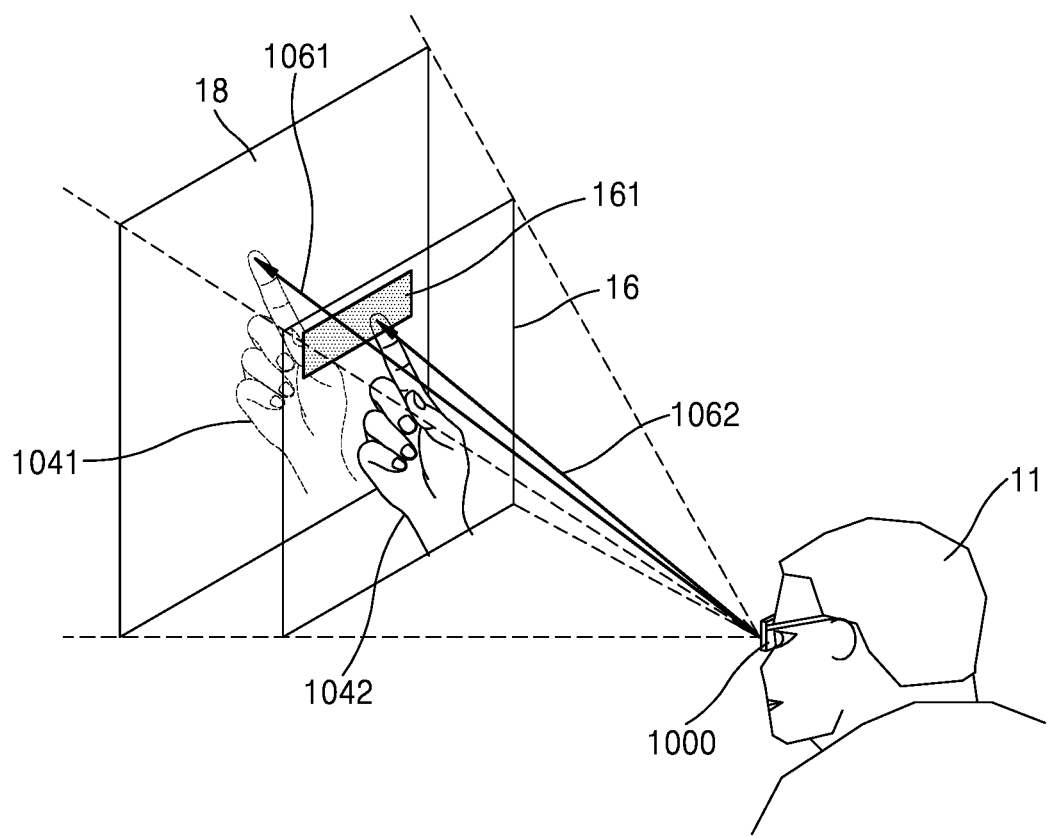
FIG. 10 shows a back screen input method of a user regarding a floating object displayed by an HMD device, according to an embodiment of the disclosure.

FIG. 10 shows a back screen input method of a user regarding a floating object displayed by an HMD device, according to an embodiment of the disclosure. Referring to FIG. 10, the HMD device 1000 may measure a distance between the transparent display 1003 and the hand of the user 11 in real time.

The user 11 may, for example, move his/her hand 1041 having been located in front of the external display 18 and behind the display area 16 of the HMD device 1000 towards the HMD device 1000.

The external display 18 may be e.g., a display included in an external device separate from the HMD device 1000 or a virtual display implemented by a virtual image.

As the user 11 moves the hand towards the HMD device 1000, a distance 1061 between the transparent display 1003 and the hand of the user 11, which is measured by the HMD device 1000, may decrease.

The distance 1061 between the transparent display 1003 and the hand of the user 11 may be reduced to a preset threshold distance. The preset threshold distance may be a distance 1062, e.g., between the transparent display 1003 and the object 161 displayed in the display area 16.

For example, when the distance 1061 between the transparent display 1003 and the hand of the user 11 is reduced to the preset threshold distance or less, the HMD device 1000 may determine that a back screen input is made to the object 161 displayed in the display area 161.

For example, when the distance 1061 between the transparent display 1003 and the hand of the user 11 corresponds to the preset threshold distance or less, the HMD device 1000 may compare the 2D coordinates of the floating object in the display area 16 and the 2D coordinates of the hand of the user 11.

When it is determined based on the comparison of the 2D coordinates that the hand of the user 11 is located in an area overlapping the floating object in the display area 16, the HMD device 1000 may determine that a back screen input is made to the object 161 by the hand 1042 located in the display area 16.

Figure 11:
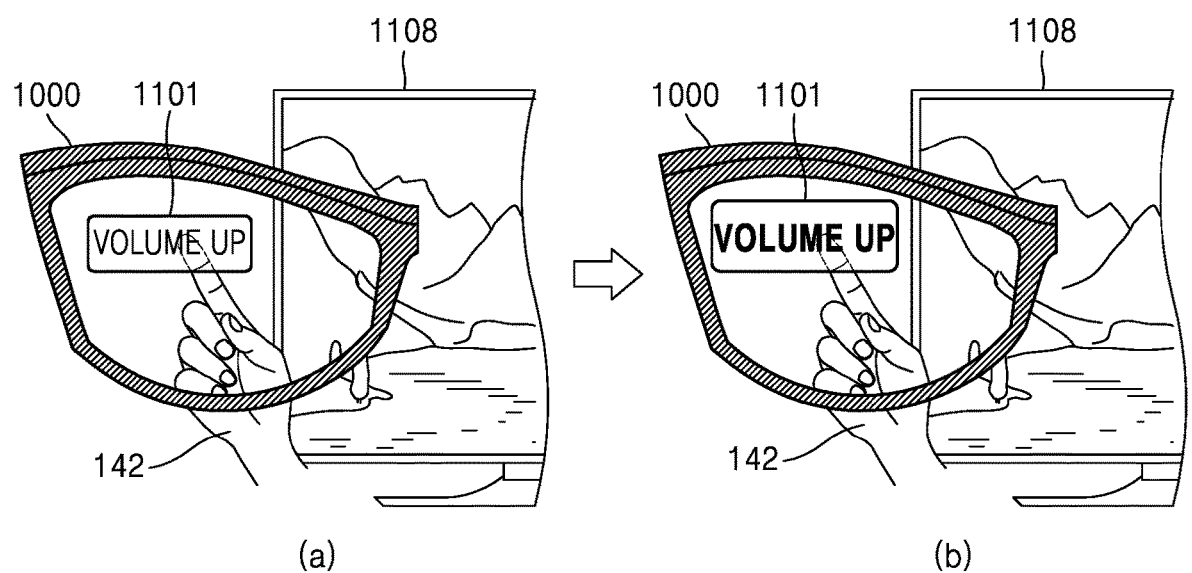
FIG. 11 shows an interaction method between an object displayed by an HMD device and a user's hand, according to an embodiment of the disclosure.

FIG. 11 shows an interaction method between an object displayed by an HMD device and a user's hand, according to an embodiment of the disclosure.

Referring to FIG. 11, the HMD device 1000 may be connected to an external device 1108 for the user 11 to control the external device 1108 through the HMD device 1000.

For example, the HMD device 1000 may display an object 1101 through the transparent display 1003 to control the external device 1108. The object 1101 may be a floating object that allows the back screen input.

The HMD device 1000 may display the object 1101 in the display area and simultaneously, set a condition by which interactions with the object 1101 are made only when the direction in which the hand of the user 11 is facing is an inward direction.

Referring to FIG. 11, the user 11 may make the back screen input to the object 1101 located in the display area in order to control the external device 1108.

The HMD device 1000 may use the camera 1005 to capture an image in front of the HMD device 1000. The HMD device 1000 may detect a hand of the user 11 located in the display area 16 from an image captured by the camera 1005.

The HMD device 1000 may determine a direction in which the hand of the user 11 interacting with the object 1101 displayed in the display area is facing based on the image captured by the camera 1005.

For example, the HMD device 1000 may measure an angle between the palm of the hand of the user 11 and the surface of the transparent display 1003, and determine that the direction of the hand of the user 11 interacting with the object 1101 displayed in the display area is the inward direction.

Referring to (a) of FIG. 1, as the hand 142 of the user 11 in the inward direction located in the display area is used for the back screen input, the object 1101 displayed in the display area and the hand 142 in the inward direction may overlap each other. The HMD device 1000 may display the object 1101 such that the user 11 may recognize the object 1101 as being in front of the hand 142 in the inward direction located in the display area.

When it is determined that the direction of the hand of the user 11 is the inward direction, the HMD device 1000 may display the entire area of the object 1101 in the display area regardless of whether the hand 142 in the inward direction and the object 1101 overlap each other.

In the meantime, referring to FIG. 11, the HMD device 1000 may determine whether the distance between the transparent display 1003 and the hand 142 of the user 11 in the inward direction corresponds to the threshold distance or less. When the measured distance corresponds to the threshold distance or less, the HMD device 1000 may obtain 2D coordinates of the hand 142 in the inward direction in the display area.

The HMD device 1000 may obtain the back screen input of the user 11 to the object 1101 based on the 2D coordinates of the hand 142 in the inward direction and the location of the object 1101.

For example, as the HMD device 1000 obtains the back screen input of the user 11, the HMD device 1000 may change the form of the object 1101. For example, the HMD device 1000 may temporarily increase the size of the object 1101 in response to an interaction of the user 11 with the object 1101 as shown in (b) of FIG. 11.

Having obtained the back screen input of the user 11 to the object 1101, the HMD device 1000 may perform a certain function corresponding to the back screen input and the object 1101.

For example, the HMD device 1000 may generate a control command to control the external device 1108 based on a function name displayed on the object 1101.

The object 1101 may include, for example, a virtual button to increase the sound volume output from the external device 1108. Having obtained the back screen input of the user 11 to the object 1101, the HMD device 1000 may generate a control command to increase the sound volume output from the external device 1108.

The HMD device 1000 may send the control command to the external device 1108. Upon reception of the control command from the HMD device 1000, the external device 1108 may increase the sound volume output.

Figure 12:
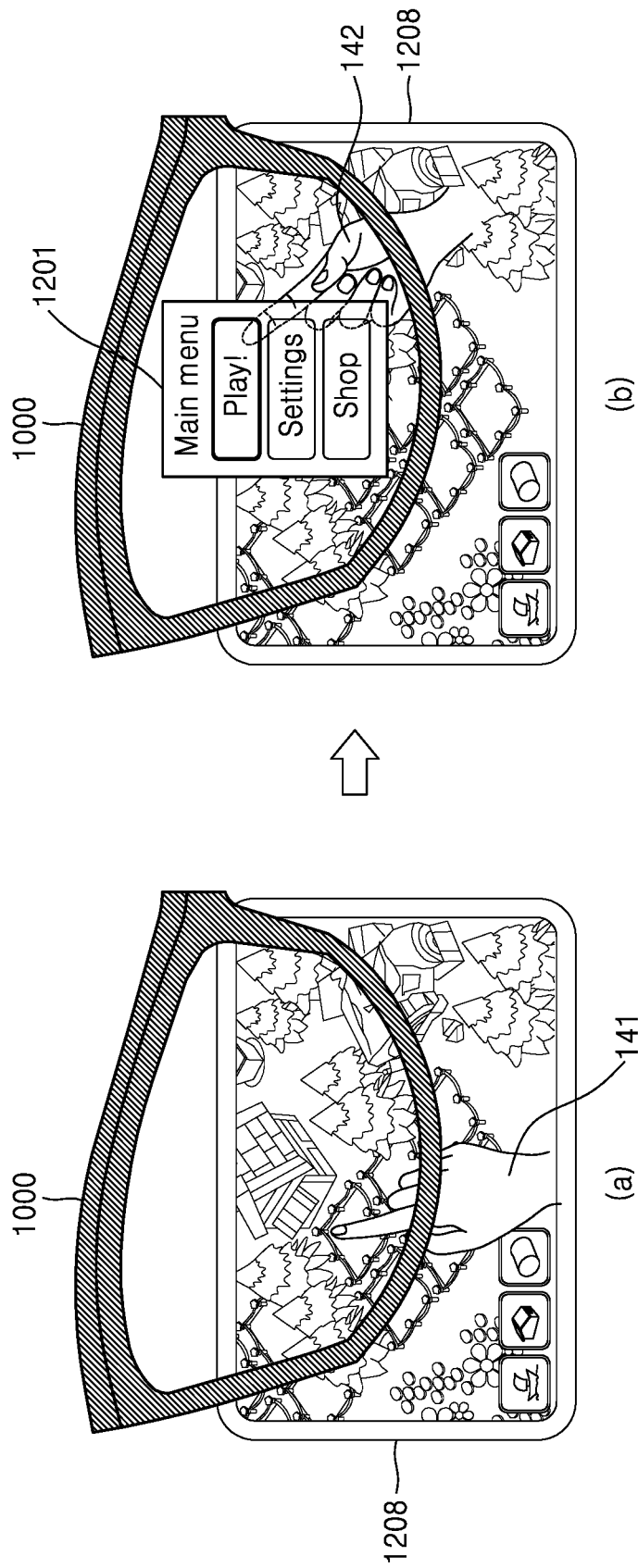
FIG. 12 shows an individual input method of a user regarding an HMD device and an external device, according to an embodiment of the disclosure.

FIG. 12 shows an individual input method of a user regarding an HMD device and an external device, according to an embodiment of the disclosure.

Referring to FIG. 12, the HMD device 1000 may be connected to an external device 1208 for the user 11 to control the external device 1208 through the HMD device 1000.

The external device 1208 may include e.g., a touch screen, to receive a separate touch input from the user 11 who uses the HMD device 1000.

For example, the HMD device 1000 may display an object 1201 through the transparent display 1003 to control the external device 1208. The object 1201 may be a floating object that allows the back screen input.

The HMD device 1000 may display the object 1201 in the display area and simultaneously, set a condition by which interactions with the object 1201 are made only when the direction in which the hand of the user 11 is facing is an inward direction.

Referring to (a) of FIG. 12, the user 11 may touch an object displayed on the touch screen of the external device 1208 to control the external device 1208.

The HMD device 1000 may use the camera 1005 to capture an image in front of the HMD device 1000. The HMD device 1000 may detect a hand of the user 11 located in the display area 16 from an image captured by the camera 1005.

The HMD device 1000 may determine a direction in which the hand of the user 11 touching the object displayed on the touch screen of the external device 1208 is facing, based on the image captured by the camera 1005.

For example, the HMD device 1000 may measure an angle between the palm of the hand of the user 11 and the surface of the transparent display 1003, and determine that the direction of the hand of the user 11 touching the object displayed on the touch screen of the external device 1208 is the outward direction.

Referring to (b) of FIG. 12, the user 11 may make the back screen input to an object 1201 located in the display area in order to control the external device 1208.

For example, the HMD device 1000 may measure an angle between the palm of the hand of the user 11 and the surface of the transparent display 1003, and determine that the direction of the hand of the user 11 interacting with the object 1201 displayed in the display area is the inward direction.

For example, the HMD device 1000 may determine whether to display the object 1201 in the display area 16 based on the direction in which the hand of the user 11 is facing.

FIG. 12 shows that the HMD device 1000 may display the object 1201 in the display area to control the external device 1208 as the direction of the hand of the user 11 is changed from the outward direction to inward direction.

As the hand 142 in the inward direction located in the display area is used for the back screen input, the object 1201 displayed in the display area and the hand 142 in the inward direction may overlap each other as shown in (b) of FIG. 12. The HMD device 1000 may display the object 1201 such that the user 11 may recognize the object 1201 as being in front of the hand 142 in the inward direction located in the display area.

When it is determined that the direction in which the hand of the user 11 is facing is the inward direction, the HMD device 1000 may display the entire area of the object 1201 in the display area regardless of whether the hand 142 in the inward direction and the object 1201 overlap each other.

Similarly, the HMD device 1000 may not display the object 1201 any longer in the display area to control the external device 1208 as the direction of the hand of the user 11 is changed from the inward direction to the outward direction.

In the meantime, referring to (b) of FIG. 12, the HMD device 1000 may determine whether the distance between the transparent display 1003 and the hand of the user 11 corresponds to the threshold distance or less. When the measured distance corresponds to the threshold distance or less, the HMD device 1000 may obtain 2D coordinates of the hand 142 in the inward direction in the display area.

The HMD device 1000 may obtain the back screen input of the user 11 to the object 1201 based on the 2D coordinates of the hand 142 in the inward direction and the location of the object 1201.

Having obtained the back screen input of the user 11 to the object 1201, the HMD device 1000 may perform a certain function corresponding to the back screen input and the object 1201.

For example, the HMD device 1000 may generate a control command to control the external device 1208 based on a function name displayed on the object 1201.

The HMD device 1000 may send the control command to the external device 1208. Upon reception of the control command from the HMD device 1000, the external device 1208 may perform a function corresponding to the control command.

Figure 13:
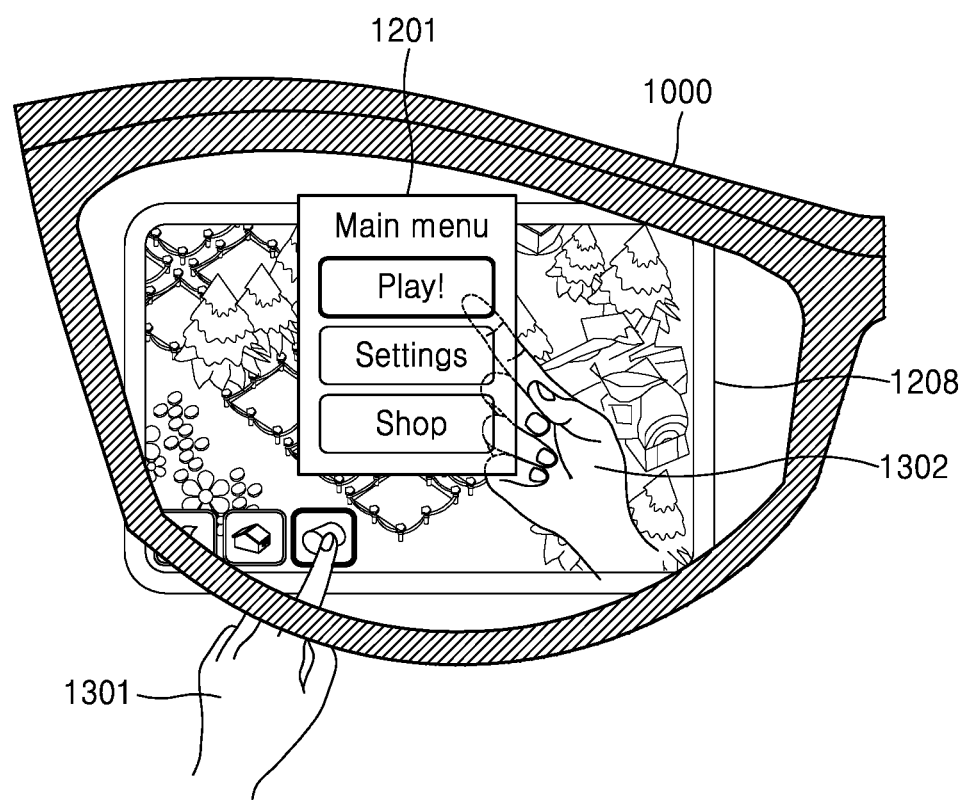
FIG. 13 shows a simultaneous input method of a user regarding an external display device and a floating object of an HMD device, according to an embodiment of the disclosure.

FIG. 13 shows a simultaneous input method of a user regarding an external display device and a floating object of an HMD device, according to an embodiment of the disclosure.

Referring to FIGS. 12, and 13, the user 11 may simultaneously make inputs to the HMD device 1000 and to the external device 1208.

For example, the user 11 may touch an object displayed on a touch screen of the external device 1208 to control the external device 1208 and simultaneously make the back screen input to the object 1201 located in the display area.

The HMD device 1000 may use the camera 1005 to capture an image in front of the HMD device 1000. The HMD device 1000 may detect left and right hands 1301 and 1302 of the user 11 located in the display area 16 from the image captured by the camera 1005.

The HMD device 1000 may determine directions in which the left and right hands 1301 and 1302 of the user 11 touching objects displayed on the touch screen of the external device 1208 and located in the display area, respectively are facing, based on the image captured by the camera 1005.

For example, the HMD device 1000 may measure an angle between the palm of the left hand 1301 of the user 11 and the surface of the transparent display 1003, and determine that the direction of the left hand 1301 of the user 11 touching an object displayed on the touch screen of the external device 1208 is the outward direction.

The HMD device 1000 may measure an angle between the palm of the right hand 1302 of the user 11 and the surface of the transparent display 1003, and determine that the direction of the right hand 1302 of the user 11 interacting with an object 1201 displayed in the display area is the inward direction.

For example, the HMD device 1000 may determine whether to display an object in the display area based on the direction in which at least one of the both hands of the user 11 is facing.

For example, the HMD device 1000 may display the object 1201 in the display area to control the external device 1208 as the direction of the right hand 1302 of the user 11 is changed from the outward direction to the inward direction.

Similarly, for example, the HMD device 1000 may not display the object 1201 any longer in the display area to control the external device 1208 as the direction of the right hand 1302 of the user 11 is changed from the inward direction to the outward direction.

In the meantime, the HMD device 1000 may determine whether to display the object 1201 in the display area based on an input of the user to the external device 1208.

For example, the HMD device 1000 may display the object 1201 in the display area to control the external device 1208 as the left hand 1301 of the user 11 touches a certain object displayed on the touch screen of the external device 1208.

For example, the object 1201 may be displayed in the display area for a period of time that the touch onto the object displayed on the touch screen of the external device 1208 lasts. In another example, the object 1201 may be toggled between displayed and not displayed in the display area when the left hand 1301 of the user 11 touches the object displayed on the touch screen of the external device 1208.

The HMD device 1000 may determine whether the distance between the transparent display 1003 and the right hand 1302 of the user 11 corresponds to a threshold distance or less. When the measured distance corresponds to the threshold distance or less, the HMD device 1000 may obtain 2D coordinates of the right hand 1302 in the inward direction in the display area.

The HMD device 1000 may obtain the back screen input of the user 11 to the object 1201 based on the 2D coordinates of the right hand 1302 in the inward direction and the location of the object 1201.

Because the HMD device 1000 set a condition such that interactions between a hand of the user 11 and the object 1201 are made only when the hand of the user 11 is in the inward direction, the left hand 1301 of the user 11 in the outward direction touching an object displayed on the touch screen of the external device 1208 may not have an influence on the object 1201.

Having obtained the back screen input of the user 11 to the object 1201, the HMD device 1000 may perform a certain function corresponding to the back screen input and the object 1201.

For example, the HMD device 1000 may generate a control command to control the external device 1208 based on a function name displayed on the object 1201.

The HMD device 1000 may send the control command to the external device 1208. Upon reception of the control command from the HMD device 1000, the external device 1208 may perform a function corresponding to the control instruction.

Figure 14:
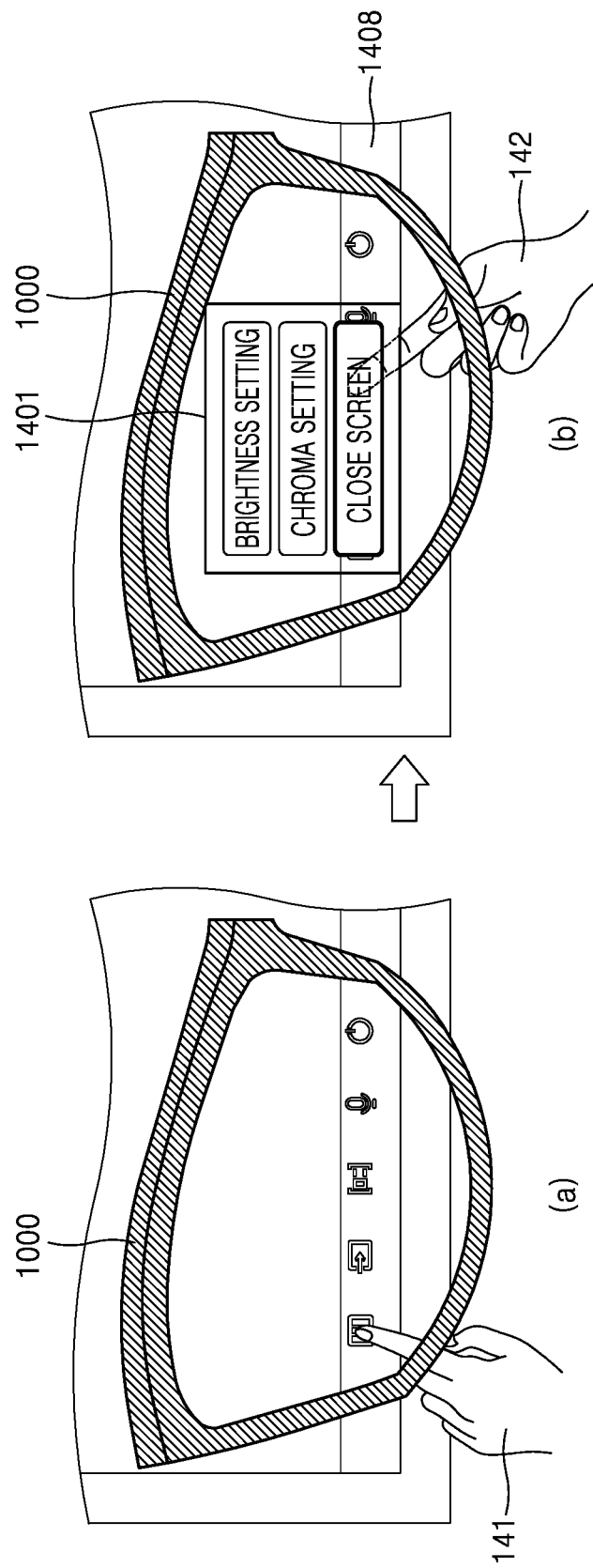
FIG. 14 shows an interaction method between a user's hand and an object displayed by an HMD device used simultaneously with an external device, according to an embodiment of the disclosure.

FIG. 14 shows an interaction method between a user's hand and an object displayed by an HMD device used simultaneously with an external device, according to an embodiment of the disclosure.

Referring to FIG. 14, the HMD device 1000 may be connected to an external device 1408 for the user 11 to control the external device 1408 through the HMD device 1000.

For example, the HMD device 1000 may display an object 1401 through the transparent display 1003 to control the external device 1408. The object 1401 may be e.g., a floating object that allows the back screen input.

The HMD device 1000 may display the object 1401 in the display area and simultaneously, set a condition by which interactions with the object 1401 are made only when the direction in which the hand of the user 11 is facing is an inward direction.

Referring to (a) of FIG. 14, the user 11 may push a real button of the external device 1408 to control the external device 1408.

Referring to (b) of FIG. 14, the HMD device 1000 may display the object 1401 in the display area to control the external device 1408 as the hand 141 of the user 11 in the outward direction pushes the real button of the external device 1408. The object 1401 may include, for example, a virtual button to control a function of the external device 1408 corresponding to the real button.

For example, the object 1401 may be toggled between displayed and not displayed in the display area when manipulation of the real button of the external device 1408 is made.

When the object 1401 is displayed, the HMD device 1000 may use the camera 1005 to capture an image in front of the HMD device 1000. The HMD device 1000 may detect the hand of the user 11 located in the display area from the image captured by the camera 1005.

The HMD device 1000 may determine a direction in which the hand of the user 11 interacting with the object 1401 displayed in the display area is facing, based on the image captured by the camera 1005.

For example, the HMD device 1000 may measure an angle between the palm of the hand of the user 11 and the surface of the transparent display 1003, and determine that the direction of the hand of the user 11 interacting with the object 1401 displayed in the display area is the inward direction.

As the hand 142 in the inward direction located in the display area is used for the back screen input, the object 1401 displayed in the display area and the hand 142 in the inward direction may overlap each other. The HMD device 1000 may display the object 1401 such that the user 11 may recognize the object 1401 as being in front of the hand 142 in the inward direction located in the display area.

When it is determined that the direction of the hand of the user 11 is the inward direction, the HMD device 1000 may display the entire area of the object 1401 in the display area regardless of whether the hand 142 in the inward direction and the object 1401 overlap each other.

The HMD device 1000 may determine whether the distance between the transparent display 1003 and the hand 142 of the user 11 in the inward direction corresponds to a threshold distance or less. When the measured distance corresponds to the threshold distance or less, the HMD device 1000 may obtain 2D coordinates of the hand 142 in the inward direction in the display area.

The HMD device 1000 may obtain the back screen input of the user 11 to the object 1401 based on the 2D coordinates of the hand 142 in the inward direction and the location of the object 1401.

Having obtained the back screen input of the user 11 to the object 1101, the HMD device 1000 may perform a certain function corresponding to the back screen input and the object 1401.

For example, the HMD device 1000 may display a new object in the display area to control the external device 1408 based on a function name displayed on the object 1401.

The object 1401 may include, for example, a virtual button to control brightness of the screen of the external device 1408. In another example, the object 1401 may include a virtual button to control chroma of the screen of the external device 1408.

Although not shown in FIG. 14, the HMD device 1000 having obtained the back screen input of the user 11 to a virtual button included in the object 1401 may display a new object in the display area to control an attribute of the screen of the external device 1408.

Based on an input of the user 11 to at least one of the object 1401 or the new object, the HMD device 1000 may generate a control command to control the external device 1408.

The HMD device 1000 may send the control command to the external device 1408. Upon reception of the control command from the HMD device 1000, the external device 1408 may perform a function corresponding to the control command.

Figure 15:
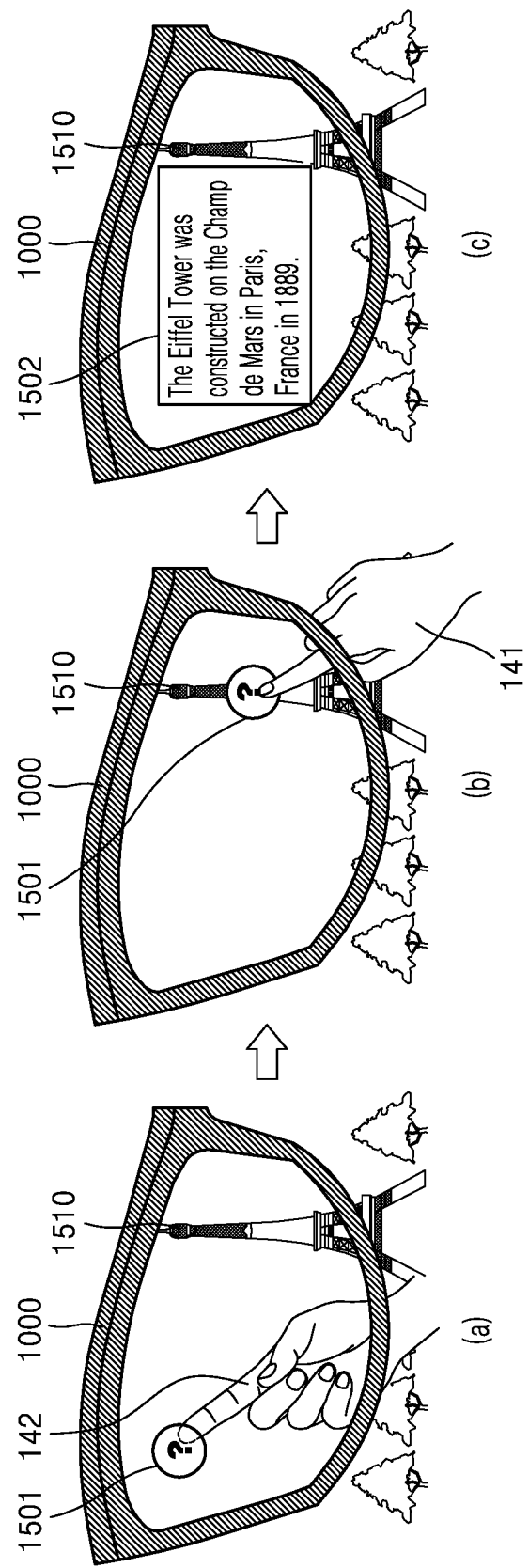
FIG. 15 shows an interaction method between an object displayed by an HMD device and a user's hand, according to an embodiment of the disclosure.

FIG. 15 shows an interaction method between an object displayed by an HMD device and a user's hand, according to an embodiment of the disclosure.

Referring to FIG. 15, the HMD device 1000 may use the camera 1005 to capture an image in front of the HMD device 1000. For example, referring to (a) of FIG. 15, the HMD device 1000 may detect a real object 1510 that exists in a surrounding environment of the HMD device 1000 from the image captured by the camera 1005.

For example, the HMD device 1000 may display an object 1501 in the display area to provide information about the real object 1510, based on a result of image analysis on the real object 1510. The object 1501 may be, e.g., a floating object that allows the back screen input.

The HMD device 1000 may display the object 1501 in the display area and simultaneously, set a condition by which interactions with the object 1501 are made only when the direction in which the hand of the user 11 is facing is an inward direction.

Referring to (a) of FIG. 15, the user 11 may make the back screen input to the object 1501 located in the display area in order to obtain the information about the real object 1510.

The HMD device 1000 may use the camera 1005 to capture an image in front of the HMD device 1000. The HMD device 1000 may detect the hand of the user 11 located in the display area from the image captured by the camera 1005.

The HMD device 1000 may determine a direction in which the hand of the user 11 interacting with the object 1501 displayed in the display area is facing, based on the image captured by the camera 1005.

For example, the HMD device 1000 may measure an angle between the palm of the hand of the user 11 and the surface of the transparent display 1003, and determine that the direction of the hand of the user 11 interacting with the object 1501 displayed in the display area is the inward direction.

Referring to (a) of FIG. 15, as the hand 142 in the inward direction located in the display area is used for the back screen input, the object 1501 displayed in the display area and the hand 142 in the inward direction may overlap each other. The HMD device 1000 may display the object 1501 such that the user 11 may recognize the object 1501 as being in front of the hand 142 in the inward direction located in the display area.

When it is determined that the direction of the hand of the user 11 is the inward direction, the HMD device 1000 may display the entire area of the object 1501 in the display area regardless of whether the hand 142 in the inward direction and the object 1501 overlap each other.

Referring to FIG. 15, the HMD device 1000 may change the condition for interactions with the object 1501 to be made only when the direction in which the hand of the user 11 is facing is the outward direction, in response to the back screen input to the object 1501. That is, the object 1501 may be changed to a background object that allows the on screen input from a floating object that allows the back screen input.

The HMD device 1000 may re-determine a direction in which the hand of the user 11 interacting with the object 1501 displayed in the display area is facing, based on the image captured by the camera 1005.

For example, the HMD device 1000 may measure an angle between the palm of the hand of the user 11 and the surface of the transparent display 1003 again, and determine that the direction of the hand of the user 11 interacting with the object 1501 displayed in the display area is changed to the outward direction.

Referring to (b) of FIG. 15, as the hand 141 in the outward direction and located in the display area is used for the on screen input, the object 1501 displayed in the display area and the hand 141 in the outward direction may overlap each other. The HMD device 1000 may display the object 1501 such that the user 11 may recognize the object 1501 as being behind the hand 141 in the outward direction located in the display area.

When it is determined that the direction in which the hand of the user 11 is facing is the outward direction, the HMD device 1000 may get rid of the area where the hand 141 in the outward direction and the object 1501 overlap each other from the object 1501 displayed in the display area.

The HMD device 1000 may move the location of the object 1501 in the display area as the hand 141 of the user 11 in the outward direction interacting with the object 1501 is moved in response to the on screen input of the user 11 to the object 1501. The object 1501 moved along with the hand of the user 11 may overlap the real object 1510 in the display area.

When the object 1501 overlaps the real object 1510, the HMD device 1000 may change the condition such that text including information about the real object 1510 is displayed in the display area only when an interaction of the hand 141 of the user 11 in the outward direction with the object 1501 is stopped.

Referring to (b) and (c) of FIG. 15, as the hand 141 of the user 11 in the outward direction interacting with the object 1501 is separated from the object 1501, the HMD device 1000 may display text 1502 including the information about the real object 1510 in the display area.

Figure 16:
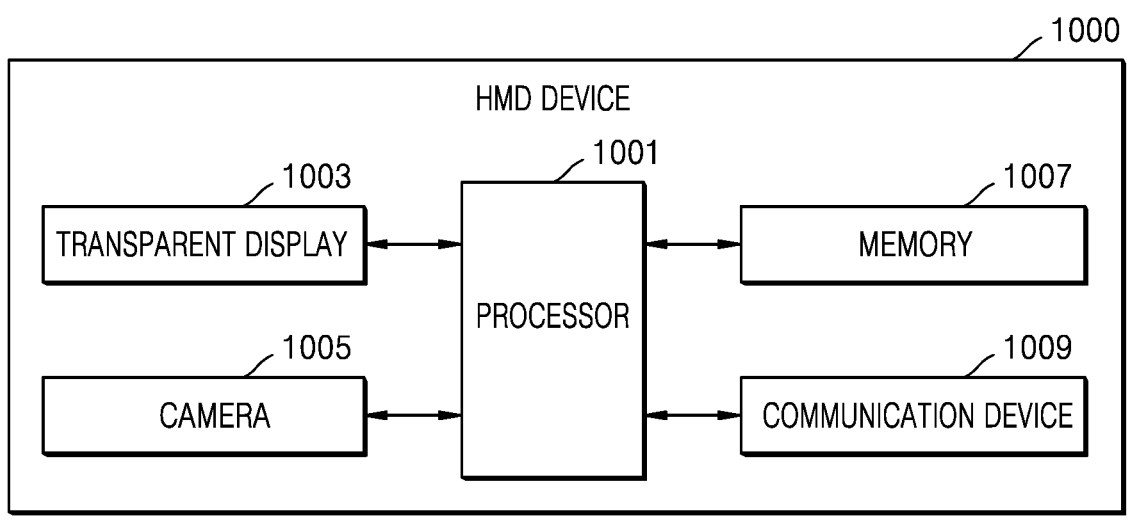
FIG. 16 is a block diagram of an HMD device, according to an embodiment of the disclosure.

FIG. 16 is a block diagram of an HMD device, according to an embodiment of the disclosure.

Referring to FIG. 16, the HMD device 1000 may include a processor 1001, the transparent display 1003, the camera 1005, a memory 1007, and a communication device 1009.

The processor 1001 may control at least one object to be displayed in a display area through the transparent display 1003.

The processor 1001 may control the camera 1005 to capture an image of a hand of the user 11 interacting with an object displayed in the display area.

For example, the processor 1001 may obtain information about at least one of a location, a form, or a moving direction of the hand of the user 11 in the display area, based on the image captured by the camera 1005.

The processor 1001 may determine a direction in which the hand of the user 11 interacting with an object displayed in the display area is facing based on the image captured by the camera 1005.

For example, the processor 1001 may measure an angle between the palm of the hand of the user 11 and the surface of the transparent display 1003, and determine a direction of the hand of the user 11 based on the measured angle.

For example, the processor 1001 may classify the direction of the hand of the user 11 as one of an inward direction in which the palm of the hand of the user 11 is facing the transparent display 1003 and an outward direction in which the palm of the hand of the user 11 is facing the opposite direction of the transparent display 1003.

The processor 1001 may perform a certain function that matches the object interacting with the hand of the user 11 and the direction in which the hand of the user 11 is facing.

For example, when an object interacting with the hand of the user 11 is a floating object and the hand of the user 11 is in the inward direction, the processor 1001 may perform a certain function corresponding to the floating object interacting with the hand of the user 11.

For example, when a distance between the transparent display 1003 and the hand corresponds to a threshold distance or less, the processor 1001 may determine that an interaction with the floating object is made.

For example, when an object interacting with the hand of the user 11 is a background object and the direction in which the hand of the user 11 is facing is the outward direction, the processor 1001 may perform a certain function corresponding to the background object interacting with the hand of the user 11.

The processor 1001 may determine whether to display an object in an area where the object overlaps the hand of the user 11 in the display area based on the direction in which the hand of the user 11 facing.

For example, the processor 1001 may identify depth of the hand of the user 11 interacting with the object based on the captured image, and determine whether to display an object in an overlapping area between the hand of the user 11 and the object in the display area based on the identified depth of the hand and the type of the object.

The transparent display 1003 may display at least one object in the display area 16.

Once the at least one object is displayed through the transparent display 1003, the user 11 may recognize that the object is displayed at a particular location in the display area 16. While the at least one object is displayed on the transparent display 1003, the user 11 may perceive a surrounding environment through light passing through the transparent display 1003.

The transparent display 1003 may display a user interface to control the HMD device 1000, a user interface to display status of the HMD device 1000, etc.

The memory 1007 may store a program for controlling the operation of the HMD device 1000. The memory 1007 may store at least one instruction to control the operation of the HMD device 1000. The program stored in the memory 1007 may be classified into multiple modules on the function basis.

The memory 1007 may include at least one type of storage medium including a flash memory, a hard disk, a multimedia card micro type memory, a card type memory (e.g., SD or XD memory), a Random Access Memory (RAM), a Static Random Access Memory (SRAM), a Read-Only Memory (ROM), an Electrically Erasable Programmable Read-Only Memory (EEPROM), a Programmable Read-Only Memory (PROM), a magnetic memory, a magnetic disk, and an optical disk.

The communication device 1009 may include one or more communication modules enabling communication with external devices. For example, the communication device 1009 may include a short-range communication module and a mobile communication module.

The short-range communication module may include a bluetooth communication module, a bluetooth low energy (BLE) communication module, a near field communication (NFC) module, a wireless local area network (WLAN), e.g., Wi-Fi, communication module, a Zigbee communication module, an infrared data association (IrDA) communication module, a Wi-Fi direct (WFD) communication module, an ultra wideband (UWB) communication module, an Ant+ communication module, etc., without being limited thereto.

The mobile communication module transmits and receives RF signals to and from at least one of a base station, an external terminal, or a server in a mobile communication network. The RF signal may include a voice call signal, a video call signal or different types of data involved in transmission/reception of a text/multimedia message.

Some embodiments of the disclosure may be implemented in the form of a computer-readable recording medium that includes computer-executable instructions such as the program modules executed by the computer. The computer-readable recording medium may be an arbitrarily available medium that may be accessed by the computer, including volatile, non-volatile, removable, and non-removable mediums. The computer-readable recording medium may also include a computer storage medium. The volatile, non-volatile, removable, and non-removable mediums may be implemented by an arbitrary method or technology for storage of information, such as computer-readable instructions, data structures, program modules, or other data.

In the specification, the term "module" may refer to a hardware component such as a processor or a circuit, and/or a software component executed by the hardware component such as the processor.

According to the disclosure, an HMD device and operating method thereof, which understand an intention of a user regarding an interaction with an object in a display area, based on a direction in which the user's hand is facing, thereby giving more immersive experiences for the user are provided.

Several embodiments of the disclosure have been described, but one of ordinary skill in the art will understand and appreciate that various modifications can be made without departing the scope of the disclosure. Thus, it will be apparent to one of ordinary skill in the art that the embodiments of the disclosure are examples and are not limited thereto. For example, an element described in the singular form may be implemented as being distributed, and elements described in a distributed form may be implemented as being combined.

The scope of the disclosure is defined by the appended claims, and it will be understood by one of ordinary skill in the art that various changes in form and details may be made without departing from the spirit and scope of the disclosure as defined by the appended claims and their equivalents.

What is claimed is:

1. An operating method of a head mounted display (HMD) device, the operating method comprising:
    obtaining, through a camera, an image of a hand of a user;
    determining a direction in which a palm of the hand is facing based on the obtained image;
    based on the direction in which the palm of the hand is facing being determined as an outward direction, displaying an object by removing an area where the hand in the outward direction and the object overlap with each other;
    in response to the direction in which the palm of the hand is facing being changed from the outward direction to an inward direction, displaying at least one object for controlling an external device through a transparent display;
    obtaining depth information of the hand of the user based on the obtained image;
    determining that an interaction between the at least one object and the hand is made based on the obtained depth information of the hand; and
    performing a predetermined function of controlling the external device corresponding to the interaction between the at least one object and the hand,
    wherein the palm of the hand faces the transparent display and the camera in the inward direction, and the palm of the hand faces an opposite direction of the inward direction in the outward direction.

2. The operating method of claim 1, further comprising obtaining information about at least one of a location, a form, or a moving direction of the hand in the transparent display, based on the obtained image.

3. The operating method of claim 1, wherein the determining of the direction in which the palm of the hand is facing, based on the obtained image, comprises:
    measuring an angle between the palm of the hand and a surface of the transparent display; and
    determining the direction in which the palm of the hand is facing as the inward direction in which the palm of the hand is facing the transparent display and the camera, based on the measured angle.

4. The operating method of claim 1, wherein the performing of the predetermined function comprises determining that the interaction between the at least one object and the hand is made when a distance between the transparent display and the hand corresponds to a threshold distance or less.

5. The operating method of claim 1, wherein the performing of the predetermined function comprises performing a function corresponding to a background object interacting with the hand of the user when the object interacting with the hand of the user is the background object and the direction in which the palm of the hand is facing is the outward direction.

6. The operating method of claim 1, further comprising identifying the at least one object interacting with the hand of the user, based on the direction in which the palm of the hand is facing.

7. The operating method of claim 1, wherein the displaying of the at least one object comprises:
    identifying a depth of the hand interacting with the at least one object, based on the obtained image; and
    determining whether to display the at least one object in an overlapping area between the hand and the at least one object in the transparent display based on the identified depth of the hand and a type of the at least one object.

8. A head mounted display (HMD) device comprising:
    a camera;
    a transparent display;
    a memory storing one or more instructions; and
    at least one processor configured to execute the one or more instructions to:

obtain, through the camera, an image of a hand of a user,
determine a direction in which a palm of the hand is facing based on the obtained image,
based on the direction in which the palm of the hand is facing being determined as an outward direction, display, through the transparent display, an object by removing an area where the hand in the outward direction and the object overlap with each other,
in response to the direction in which the palm of the hand is facing being changed from the outward direction to an inward direction, display, through the transparent display, at least one object for controlling an external device the inward direction in the outward direction,
obtain depth information of the hand of the user based on the obtained image,
determine that an interaction between the at least one object and the hand is made based on the obtained depth information of the hand, and
perform a predetermined function of controlling the external device corresponding to the interaction between the at least one object and the hand,
wherein the palm of the hand faces the transparent display and the camera in the inward direction, and the palm of the hand faces an opposite direction of the inward direction in the outward direction.

9. The HMD device of claim 8, wherein the at least one processor is further configured to obtain information about at least one of a location, a form, or a moving direction of the hand in the transparent display, based on the obtained image.

10. The HMD device of claim 8, wherein the at least one processor is further configured to:
measure an angle between the palm of the hand and a surface of the transparent display; and
determine the direction in which the palm of the hand is facing as the inward direction in which the palm of the hand is facing the transparent display and the camera, based on the measured angle.

11. The HMD device of claim 8, wherein the at least one processor is further configured to determine that the interaction between the at least one object and the hand is made when a distance between the transparent display and the hand corresponds to a threshold distance or less.

12. The HMD device of claim 8, wherein the at least one processor is further configured to perform a function corresponding to a background object interacting with the hand of the user when the at least one object interacting with the hand of the user is the background object and the direction in which the palm of the hand is facing is the outward direction.

13. The HMD device of claim 8, wherein the at least one processor is further configured to:
identify a depth of the hand interacting with the at least one object, based on the obtained image; and
determine whether to display the at least one object in an overlapping area between the hand and the at least one object in the transparent display, based on the identified depth of the hand and a type of the at least one object.

14. A non-transitory computer-readable recording medium having a program recorded thereon, which when executed by a computer, performs a method comprising:
obtaining, through a camera, an image of a hand of a user;
determining a direction in which a palm of the hand is facing based on the obtained image;
based on the direction in which the palm of the hand is facing being determined as an outward direction, displaying an object by removing an area where the hand in the outward direction and the object overlap with each other;
in response to the direction in which the palm of the hand is facing being changed from the outward direction to an inward direction, displaying at least one object for controlling an external device through a transparent display;
obtaining depth information of the hand of the user based on the obtained image;
determining that an interaction between the at least one object and the hand is made based on the obtained depth information of the hand; and
performing a predetermined function of controlling the external device corresponding to the interaction between the at least one object and the hand,
wherein the palm of the hand faces the transparent display and the camera in the inward direction, and the palm of the hand faces an opposite direction of the inward direction in the outward direction.

* * * * *